(12) United States Patent
Hall et al.

(10) Patent No.: US 11,581,713 B2
(45) Date of Patent: Feb. 14, 2023

(54) METHODS AND APPARATUSES FOR ROBOTIC BREAKER RACKING

(71) Applicant: Duke Energy Corporation, Charlotte, NC (US)

(72) Inventors: Sandra Hall, Burlington, KY (US); Steve Hinkel, California, KY (US); Doug Durst, Alexandria, KY (US)

(73) Assignee: Duke Energy Corporation, Charlotte, NC (US)

( * ) Notice: Subject to any disclaimer, the term of this patent is extended or adjusted under 35 U.S.C. 154(b) by 1016 days.

(21) Appl. No.: 16/292,591

(22) Filed: Mar. 5, 2019

(65) Prior Publication Data

US 2019/0280467 A1 Sep. 12, 2019

Related U.S. Application Data

(60) Provisional application No. 62/639,262, filed on Mar. 6, 2018.

(51) Int. Cl.
| | |
|---|---|
| *B25J 11/00* | (2006.01) |
| *G05B 19/04* | (2006.01) |
| *H02B 11/127* | (2006.01) |
| *H02B 15/00* | (2006.01) |
| *H02B 3/00* | (2006.01) |
| *H02B 11/02* | (2006.01) |
| *H02B 1/36* | (2006.01) |
| *G05D 1/02* | (2020.01) |

(52) U.S. Cl.
CPC ........... *H02B 11/127* (2013.01); *B25J 11/005* (2013.01); *G05B 19/041* (2013.01); *G05D 1/0212* (2013.01); *H02B 1/36* (2013.01); *H02B 3/00* (2013.01); *H02B 11/02* (2013.01); *H02B 15/00* (2013.01); *G05B 2219/39* (2013.01)

(58) Field of Classification Search
CPC .......................... G05D 1/0212; G05B 2219/39
See application file for complete search history.

(56) References Cited

U.S. PATENT DOCUMENTS

| | | | |
|---|---|---|---|
| 7,962,898 B1 * | 6/2011 | Petry ...................... | G06V 10/95 717/124 |
| 2013/0054029 A1 * | 2/2013 | Huang ................. | G05D 1/0038 901/30 |
| 2013/0231779 A1 * | 9/2013 | Purkayastha ........ | G05D 1/0088 700/258 |
| 2017/0038419 A1 * | 2/2017 | Seong .................... | G06V 20/59 |
| 2017/0085064 A1 * | 3/2017 | Cassimere .............. | H02B 1/56 |
| 2018/0205207 A1 * | 7/2018 | Lagosz-Sinclair ... | H02B 11/127 |

* cited by examiner

*Primary Examiner* — Kira Nguyen
(74) *Attorney, Agent, or Firm* — Myers Bigel, P.A.

(57) ABSTRACT

Methods of operating a robotic breaker-racking apparatus are provided. A method of operating a robotic breaker-racking apparatus includes controlling a motor to drive the robotic breaker-racking apparatus to a first circuit breaker. The method includes accessing the first circuit breaker via remote or autonomous control of the robotic breaker-racking apparatus. Moreover, the method includes visually inspecting, via a camera of the robotic breaker-racking apparatus, a first relay of the first circuit breaker and/or a second relay of a second circuit breaker. Related robotic breaker-racking apparatuses are also provided.

22 Claims, 24 Drawing Sheets

METHODS AND APPARATUSES FOR ROBOTIC BREAKER RACKING

CLAIM OF PRIORITY

The present application claims the benefit of U.S. Provisional Patent Application Ser. No. 62/639,262, filed on Mar. 6, 2018, entitled *Methods and Apparatuses for Robotic Breaker Racking,* the disclosure of which is hereby incorporated herein in its entirety by reference.

BACKGROUND

The present disclosure relates to methods and apparatuses for circuit-breaker racking. Human operators of electric utility generating stations and substations, which support electricity distribution, are susceptible to injury or death due to problems with electrical equipment. For example, a substation may include a plurality of industrial circuit breakers, which are devices for interrupting electric current and are typically contained in a cubicle-type housing. The breakers may be connected to a heavy conductor, known as a bus, and a line via a set of disconnects.

Many large, high-voltage industrial circuit breakers (e.g., up to 13 kilovolts (kV)) can be "racked" in or out, or can have a position tested for maintenance. As an example, when such a breaker is open, the operator may use a rotary crank or lever to move the breaker forward so that it disconnects from the bus and line. When a human operator racks the breaker by disconnecting the breaker from a bus, the operator may be exposed to an arc flash, which is a violent, luminous discharge between electric conductors that can result in serious injury or death.

SUMMARY

A method of operating a robotic breaker-racking apparatus, according to various embodiments, may include controlling a motor to drive the robotic breaker-racking apparatus to a first circuit breaker. The method may include accessing the first circuit breaker via remote or autonomous control of the robotic breaker-racking apparatus. Moreover, the method may include visually inspecting, via a camera of the robotic breaker-racking apparatus, a first relay of the first circuit breaker and/or a second relay of a second circuit breaker.

In some embodiments, the accessing may include: interfacing the robotic breaker-racking apparatus with a door of a breaker cubicle that houses the first circuit breaker, to open the door; interfacing the robotic breaker-racking apparatus with a breaker switch that is inside the breaker cubicle and is coupled to the first circuit breaker, to open the breaker switch; and interfacing the robotic breaker-racking apparatus with the first circuit breaker, to perform breaker racking of the first circuit breaker. Moreover, the method may include interfacing the robotic breaker-racking apparatus with a trip button or trip switch of the first circuit breaker, to trip the first circuit breaker.

According to some embodiments, the method may include: interfacing the robotic breaker-racking apparatus with a screw of the door, to unscrew the screw before opening the door; further interfacing the robotic breaker-racking apparatus with the door, to maintain a position of the door; further interfacing the robotic breaker-racking apparatus with the door, to release the door from the position; further interfacing the robotic breaker-racking apparatus with the door, to close the door; and further interfacing the robotic breaker-racking apparatus with the screw, to re-screw the screw.

In some embodiments, the controlling the motor may include controlling travel of the robotic breaker-racking apparatus from a first location within a switchgear room of a generating station or a substation of an electric utility to a second location within the switchgear room. The controlling travel of the robotic breaker-racking apparatus may be performed while using the camera. Moreover, the controlling travel of the robotic breaker-racking apparatus may be performed while transmitting data from the camera via communications circuitry of the robotic breaker-racking apparatus. The transmitting data may, in some embodiments, include transmitting a live video feed from the camera to an electronic device of a human operator of the robotic breaker-racking apparatus via the communications circuitry.

According to some embodiments, the accessing the first circuit breaker may be performed while using the camera. For example, the accessing the first circuit breaker may be performed while transmitting data from the camera via communications circuitry of the robotic breaker-racking apparatus. Moreover, the transmitting data may include transmitting a live video feed from the camera to an electronic device of a human operator of the robotic breaker-racking apparatus via the communications circuitry.

In some embodiments, the method may include receiving a remote command, and the controlling the motor may be performed in response to the remote command. Additionally or alternatively, the method may include detecting, via the camera, a status and/or an identifier of the first relay of the first circuit breaker.

A robotic breaker-racking apparatus, according to various embodiments, may include a motor configured to drive the robotic breaker-racking apparatus to a first circuit breaker. The robotic breaker-racking apparatus may include a mechanical appendage configured to access the first circuit breaker via remote or autonomous control. Moreover, the robotic breaker-racking apparatus may include a camera configured to visually inspect a first relay of the first circuit breaker and/or a second relay of a second circuit breaker.

In some embodiments, the mechanical appendage may be a humanoid hand or a two-pincher mechanical claw. Additionally or alternatively, the camera may be one among a plurality of cameras of the robotic breaker-racking apparatus. Moreover, the camera may include a thermal sensor.

According to some embodiments, the robotic breaker-racking apparatus may include a laser-guidance system. Additionally or alternatively, the robotic breaker-racking apparatus may include a mechanical arm including a shoulder portion and an elbow portion that are configured to rotate on respective axes. The mechanical appendage may be connected to the mechanical arm.

A method of operating a robotic breaker-racking apparatus, according to various embodiments, may include controlling a motor to drive the robotic breaker-racking apparatus to a first circuit breaker. The method may include accessing, using a humanoid hand or a mechanical claw of the robotic breaker-racking apparatus, the first circuit breaker via remote or autonomous control of the robotic breaker-racking apparatus. Moreover, the method may include visually inspecting, via a camera of the robotic breaker-racking apparatus, a first relay of the first circuit breaker and/or a second relay of a second circuit breaker.

In some embodiments, the accessing may include: receiving, via wireless communications circuitry of the robotic breaker-racking apparatus, a command from a human-worn glove; and interfacing the humanoid hand or the mechanical claw of the robotic breaker-racking apparatus with a door of a breaker cubicle that houses the first circuit breaker, to open the door, in response to the command from the human-worn glove. Additionally or alternatively, the method may include interfacing the humanoid hand or the mechanical claw with a trip button or trip switch of the first circuit breaker, to trip the first circuit breaker, in response to wirelessly receiving a command (e.g., from a human-worn glove). Moreover, the accessing may include: receiving, via the wireless communications circuitry of the robotic breaker-racking apparatus, a further command from the human-worn glove; and interfacing a tool held by the humanoid hand or the mechanical claw of the robotic breaker-racking apparatus with a breaker switch that is inside the breaker cubicle and is coupled to the first circuit breaker, to open the breaker switch, in response to the further command from the human-worn glove.

DETAILED DESCRIPTION

Conventional techniques of breaker racking are manual techniques that increase the risk of harm to operators. In contrast with such conventional techniques, various embodiments of present inventive concepts described herein reduce the risk of harm to operators by isolating operators from arc flash incidents with switchgear. In particular, instead of manual racking operations performed by human operators standing in front of breakers, various embodiments of present inventive concepts described herein provide robotic breaker racking that obviates the need for human operators near the breakers. As such, even if arc flash incidents occur during the process of inserting and removing (racking) power circuit breakers in switchgear cubicles, the human operators can be at safer distances from such arc flash incidences. Moreover, though arc flashes are described herein as an example of an incident against which robotic breaker-racking apparatuses can protect human operators, a robotic breaker-racking apparatus according to various embodiments of present inventive concepts may additionally or alternatively provide protection against other hazards, including arc blast incidents.

Figure 1A:
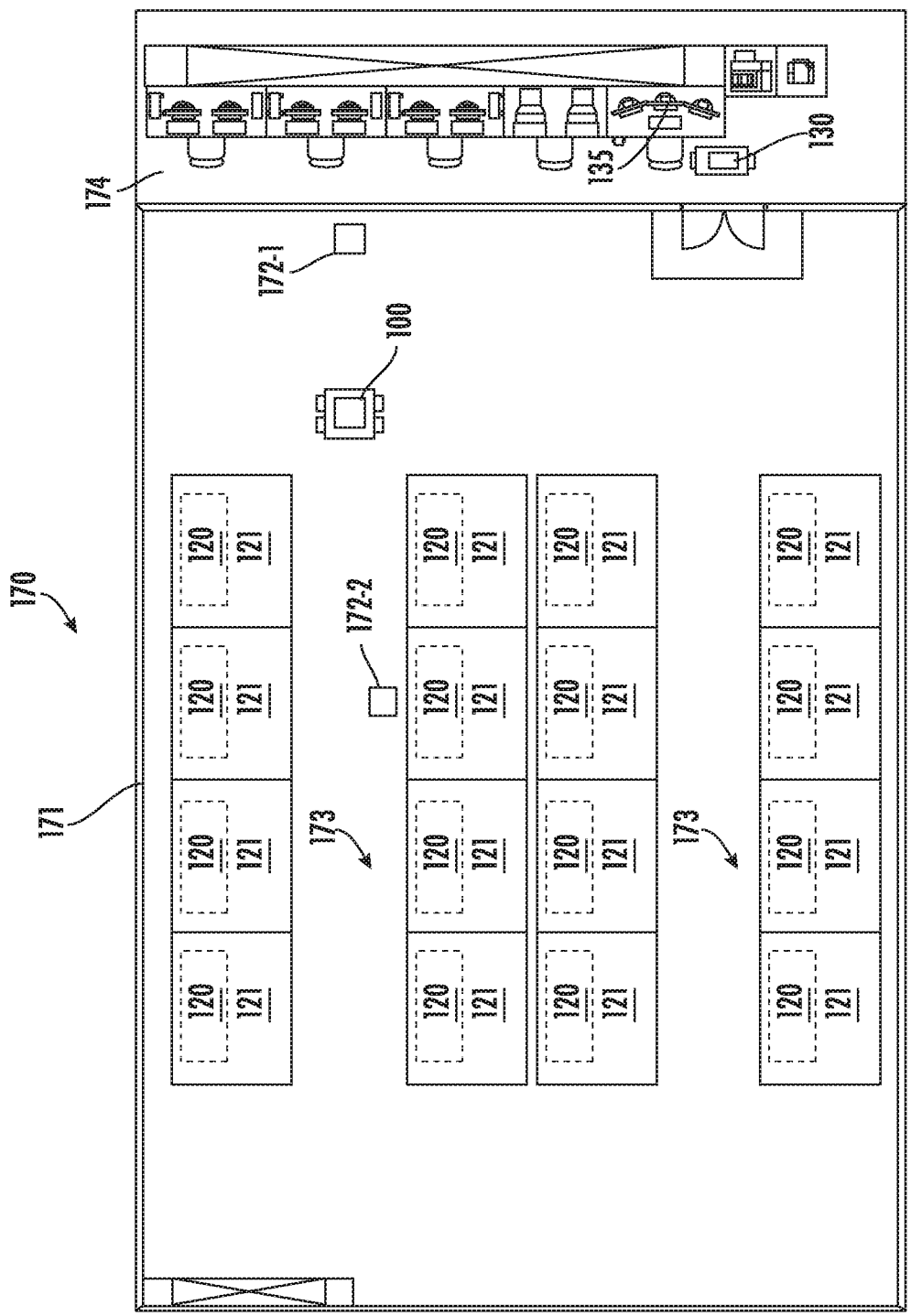
FIG. 1A is a schematic illustration of a switchgear room of a power generating station or a substation of an electric utility that includes a robotic breaker-racking apparatus according to various embodiments of present inventive concepts.

Referring to FIG. 1A, a schematic illustration of a switchgear room 171 of a power generating station or a substation 170 of an electric utility includes a robotic breaker-racking apparatus 100 according to various embodiments of present inventive concepts. The switchgear room 171 may include one or more aisles 173 between rows of circuit breakers 120 that are accessible by the robotic breaker-racking apparatus 100, which may be a Remotely Operated Vehicle (ROV) and thus may also be referred to herein as a "breaker-racking ROVer." For example, each row may include breaker cubicles/cabinets 121 that house the circuit breakers 120, which may be industrial circuit breakers. Moreover, a human operator 130 (e.g., an electric utility employee), who may have an electronic device 135, may be remotely located relative to the robotic breaker-racking apparatus 100. For example, the human operator 130 may be outside of the switchgear room 171. As an example, the human operator 130 may be in an adjacent office/control room 174.

In some embodiments, the station/substation 170 may include a plurality of switchgear rooms 171. For example, the station/substation 170 may include two, three or more switchgear rooms 171. As an example, the switchgear room 171 that is illustrated in FIG. 1A may be a main/primary switchgear room, while the other switchgear rooms 171 may be smaller rooms and/or may include fewer circuit breakers 120.

The robotic breaker-racking apparatus 100 may traverse the aisle(s) 173, such as from the location 172-1 of FIG. 1A to the location 172-2. While traversing the aisle(s) 173, or while stationary, the robotic breaker-racking apparatus 100 may visually inspect relays 160 (FIG. 4B) that are coupled to the circuit breakers 120 and are on doors 122 (FIG. 1B), or other outer surfaces, of the breaker cubicles 121. Additionally or alternatively, the robotic breaker-racking apparatus 100 may similarly thermally inspect the breaker cubicles 121. Moreover, upon detection of a potential problem, the robotic breaker-racking apparatus 100 may travel to a potentially-problematic one of the circuit breakers 120 and may inspect and/or rack that circuit breaker 120.

Figure 1B:
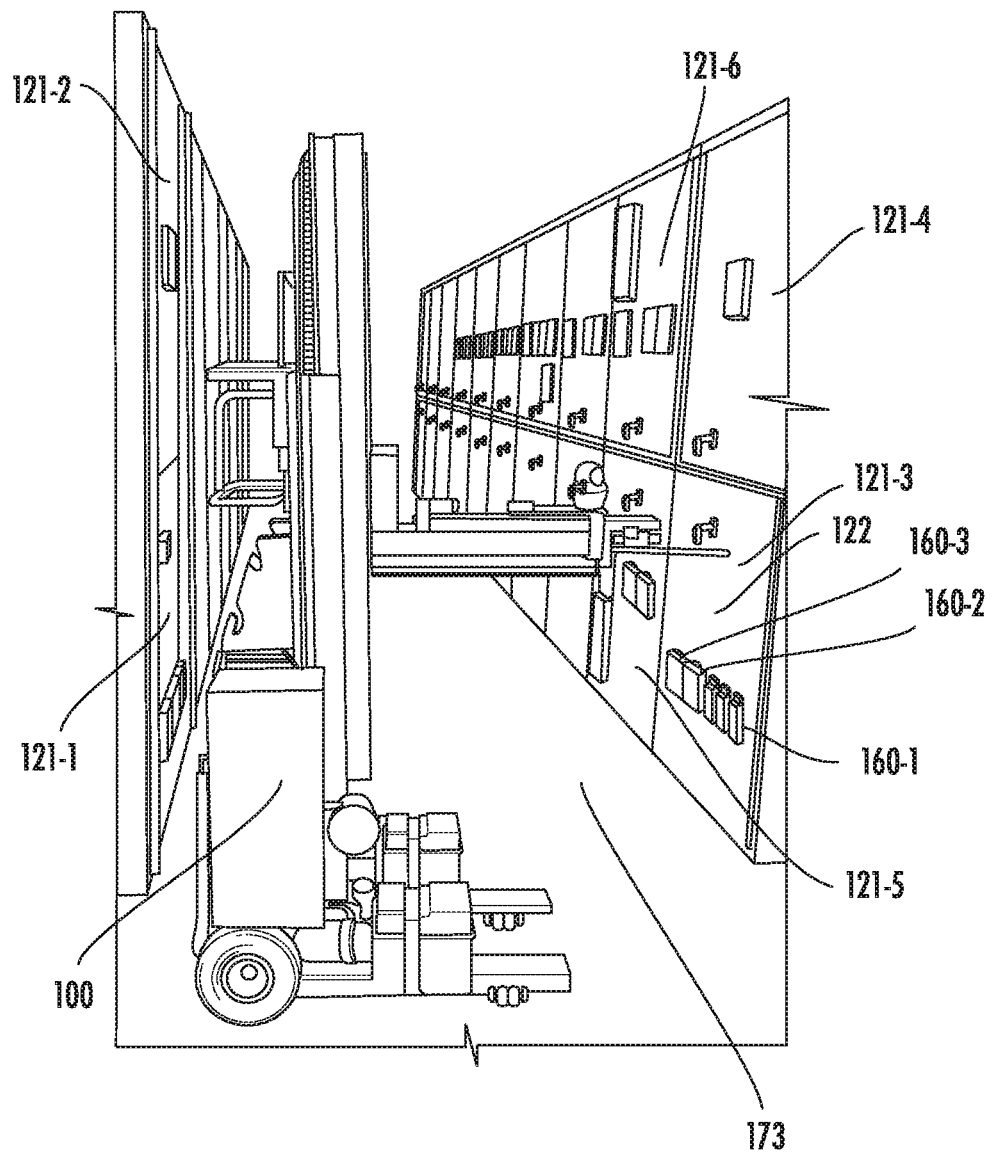
FIG. 1B is a perspective view of an aisle that a robotic breaker-racking apparatus according to various embodiments of present inventive concepts can traverse.

Referring to FIG. 1B, a perspective view is provided of an aisle 173 (of a switchgear room 171) that a robotic breaker-racking apparatus 100 according to various embodiments of present inventive concepts can traverse. Several breaker cubicles 121 (e.g., 121-1, 121-2, 121-3, 121-4, 121-5, 121-6, and so on) are accessible by the robotic breaker-racking apparatus 100 via this aisle 173. Relays 160 (FIG. 4B) on doors 122 of the breaker cubicles 121 may be visible to the robotic breaker-racking apparatus 100. For example, the relays 160 may have glass or plastic covers thereon that the robotic breaker-racking apparatus 100 can see through.

An individual breaker cubicle 121, such as the breaker cubicle 121-3, may include a plurality of relays 160 thereon, such as relays 160-1, 160-2, and 160-3. Each breaker cubicle 121 may have a respective circuit breaker 120 therein. Accordingly, each of the relays 160-1, 160-2, and 160-3 on the breaker cubicle 121-3 may be electrically coupled to the same circuit breaker 120. Moreover, in some embodiments, the breaker cubicles 121 may be stacked two (or three, four, five, or another multiple) high, and the breaker-racking apparatus 100 may be configured to adjust the height of its components to access different breaker cubicles 121 at different heights, such as a lower breaker cubicle 121-1 and an upper breaker cubicle 121-2.

Figure 1C:
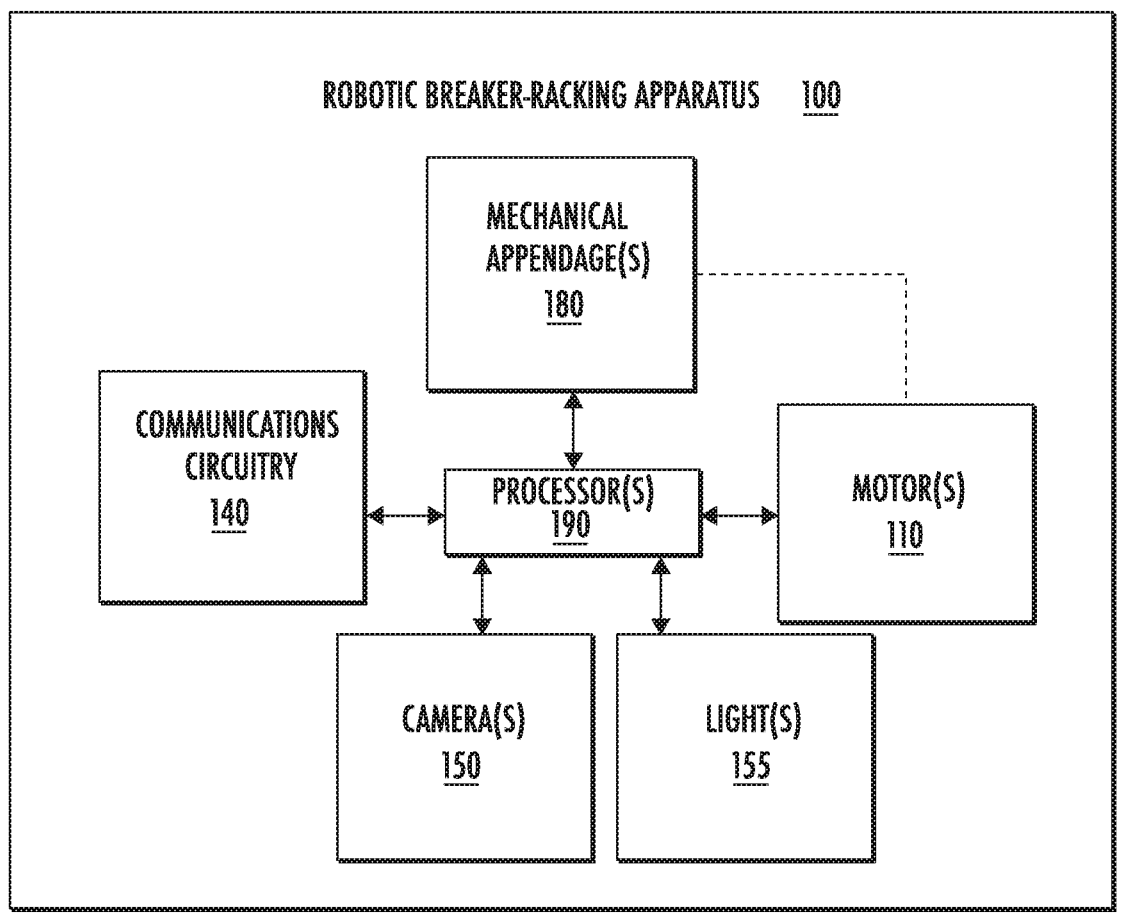
FIG. 1C is a block diagram of a robotic breaker-racking apparatus according to various embodiments of present inventive concepts.

Referring to FIG. 1C, a block diagram is provided of a robotic breaker-racking apparatus 100 according to various embodiments of present inventive concepts. The robotic breaker-racking apparatus 100 may include a combination of machines, tools, electronic hardware, and software. As an example, the robotic breaker-racking apparatus 100 may include one or more motor(s) 110 configured to drive the robotic breaker-racking apparatus 100. For example, the motor(s) 110 may be controlled, remotely or autonomously, to drive the robotic breaker-racking apparatus 100 to a first circuit breaker 120-1, such as by traveling/traversing an aisle 173. In some embodiments, the motor(s) 110 may be battery-powered by one or more batteries 560 (FIG. 5G), such as one or more 12-Volt batteries, on the robotic breaker-racking apparatus 100.

The robotic breaker-racking apparatus 100 may include one or more mechanical appendages 180 configured to access, via remote or autonomous control, the first circuit breaker 120-1. In some embodiments, the mechanical appendage(s) 180 may include one or more mechanical claws 180C (FIGS. 5D/5E/5J/5L) or humanoid hands 180H (FIG. 5K) configured to grasp and/or actuate one or more components of/in the breaker cubicles 121. For example, the mechanical appendage(s) 180 may be configured to turn light switches in a room 171 on and off. The mechanical appendage(s) 180 may be coupled to, and moved by, the motor(s) 110 or other actuators.

In some embodiments, one or more of the mechanical appendages 180 may include a built-in tool, such as a screwdriver or a wrench, or may be configured to attach a tool thereto. Moreover, the robotic breaker-racking apparatus 100 may include one or more cameras 150 configured to visually inspect a relay 160 of the first circuit breaker 120-1 and/or to visually inspect a relay 160 of a different, second circuit breaker 120-2. As an example, the robotic breaker-racking apparatus 100 may include 3-6 cameras 150. In some embodiments, one or more of the cameras 150 may be, or may include, a thermal sensor that is configured to thermally inspect the breaker cubicles 121. The thermal sensor(s) may be, or may include, an infrared sensor/scanner. Additionally or alternatively, the camera(s) 150 may be on one or more of the mechanical appendages 180.

The robotic breaker-racking apparatus 100 may also include communications circuitry 140 and control circuitry, such as one or more processors 190. The communications circuitry 140 may be configured to receive one or more remote commands to control the motor(s) 110, the camera(s) 150, and/or the appendage(s) 180. The communications circuitry 140 may additionally or alternatively be configured to transmit data (such as data from the camera(s) 150) to an electronic device 135 of a human operator 130 and/or to an electronic database/server. The communications circuitry 140 may include, for example, wireless communications circuitry such as Wi-Fi circuitry and/or cellular circuitry.

Moreover, the processor(s) 190 may be configured to process command(s) received via the communications circuitry 140 and/or a control algorithm (e.g., a control algorithm for autonomous operation(s)) that is running onboard the robotic breaker-racking apparatus 100. For example, the processor(s) 190 may control operations of the motor(s) 110, the camera(s) 150, and/or the appendage(s) 180.

In some embodiments, the robotic breaker-racking apparatus 100 may include one or more external lights 155. As an example, the external light(s) 155 may include one or more Light Emitting Diode (LED) lights. The external light(s) 155 may be used, for example, to illuminate a door 122 of a breaker cubicle 121 and/or to illuminate the interior of the breaker cubicle 121. Accordingly, the external light(s) 155 may be used in parallel with one or more operations of FIG. 2B to assist with the operation(s) of FIG. 2B.

Additionally or alternatively, the robotic breaker-racking apparatus 100 may include a speaker 521 (FIG. 5G) that can provide audio communications inside the switchgear room 171 and/or via the communications circuitry 140. Moreover, in some embodiments, a camera 150 may be equipped with a microphone that is configured to inform, via the communications circuitry 140, a human operator 130 of an initial self-check performed by the robotic breaker-racking apparatus 100, and/or to inform the human operator 130 of other events.

Figure 1D:
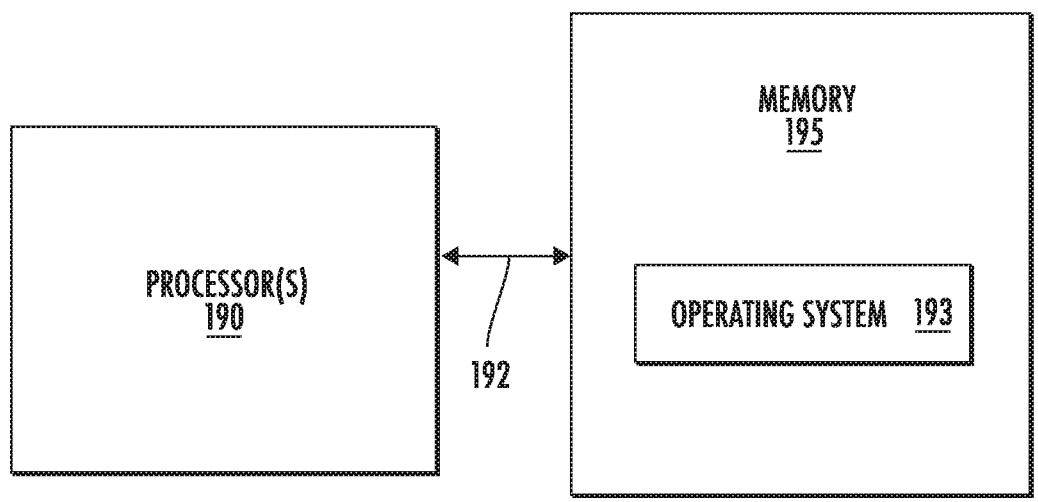
FIG. 1D is a block diagram that illustrates details of an example processor and memory of the robotic breaker-racking apparatus that may be used in accordance with various embodiments.

Referring to FIG. 1D, a block diagram is provided that illustrates details of an example processor 190 and memory 195 of the robotic breaker-racking apparatus 100 that may be used in accordance with various embodiments. The processor 190 communicates via an address/data bus 192 with the memory 195, which may store instructions/algorithms used by the processor 190. The processor 190 may be, for example, a commercially available or custom microprocessor. Moreover, the processor 190 may include multiple processors. The memory 195 is representative of the overall hierarchy of memory devices containing the software and data used to implement various functions of the motor(s) 110, the mechanical appendage(s) 180, and/or other hardware/circuitry of the robotic breaker-racking apparatus 100 as described herein. The memory 195 may include, but is not limited to, the following types of devices: cache, ROM, PROM, EPROM, EEPROM, flash, Static RAM (SRAM), and Dynamic RAM (DRAM).

As shown in FIG. 1D, the memory 195 may hold various categories of software and data, such as an operating system 193. The operating system 193 controls operations of the motor(s) 110 or other hardware/circuitry of the robotic breaker-racking apparatus 100, such as the mechanical appendage(s) 180, the communications circuitry 140, and/or the camera(s) 150. In particular, the operating system 193 may manage the resources of various circuitry of the robotic breaker-racking apparatus 100 and may coordinate execution of various programs by the processor(s) 190.

In some embodiments, the memory 195 and the processor(s) 190 may be configured to perform Digital Video Recorder (DVR) functionality by storing video/images captured by the camera(s) 150 in the memory 195. Additionally or alternatively, the communications circuitry 140 may be used to transmit the video/images for storage at a remote DVR (or for storage at a DVR that is onboard the ROVer 100). Video recording via the camera(s) 150 may be turned on/off manually by a remote human operator 130 or automatically by the robotic breaker-racking apparatus 100. Moreover, as the camera(s) 150 may be equipped with a microphone, a DVR recording performed using the camera(s) 150 may include audio.

Figure 1E:
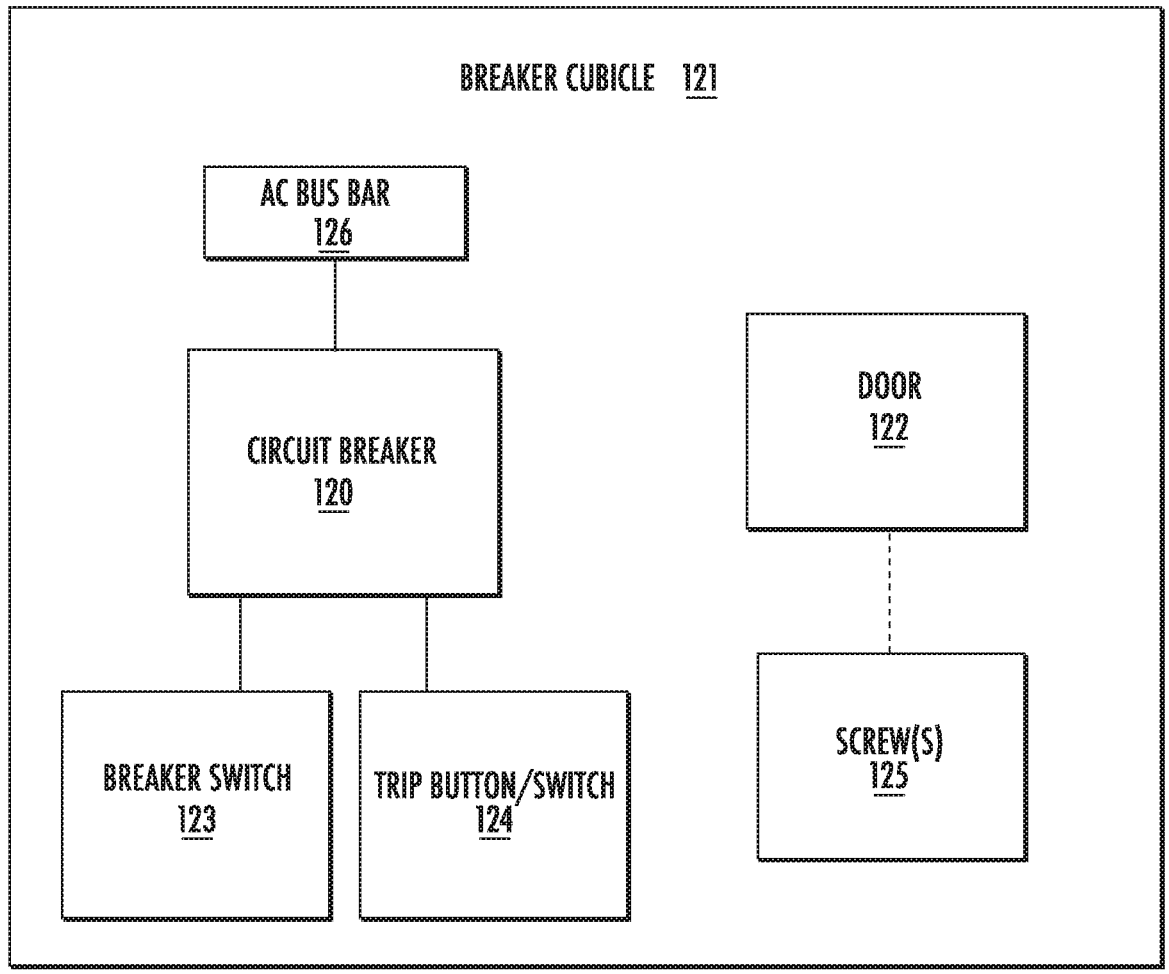
FIG. 1E is a block diagram of a breaker cabinet/cubicle that is accessible by a robotic breaker-racking apparatus according to various embodiments of present inventive concepts.

Referring to FIG. 1E, a block diagram is provided of a breaker cabinet/cubicle 121 that is accessible by a robotic breaker-racking apparatus 100 according to various embodiments of present inventive concepts. The breaker cubicle 121 may include a door 122 that provides access to the interior of the breaker cubicle 121. In some embodiments, one or more screws 125 may hold the door 122 closed. Inside the breaker cubicle 121 are a circuit breaker 120, a breaker switch 123 (e.g., a knife switch) that is electrically coupled to the circuit breaker 120, a trip button/switch 124 that is electrically coupled to the circuit breaker 120, and an Alternating Current (AC) bus bar 126 that is electrically coupled to the circuit breaker 120. The AC bus bar 126 may be a heavy conductor to which the circuit breaker 120 is connected via one or more disconnects.

Figure 2A:
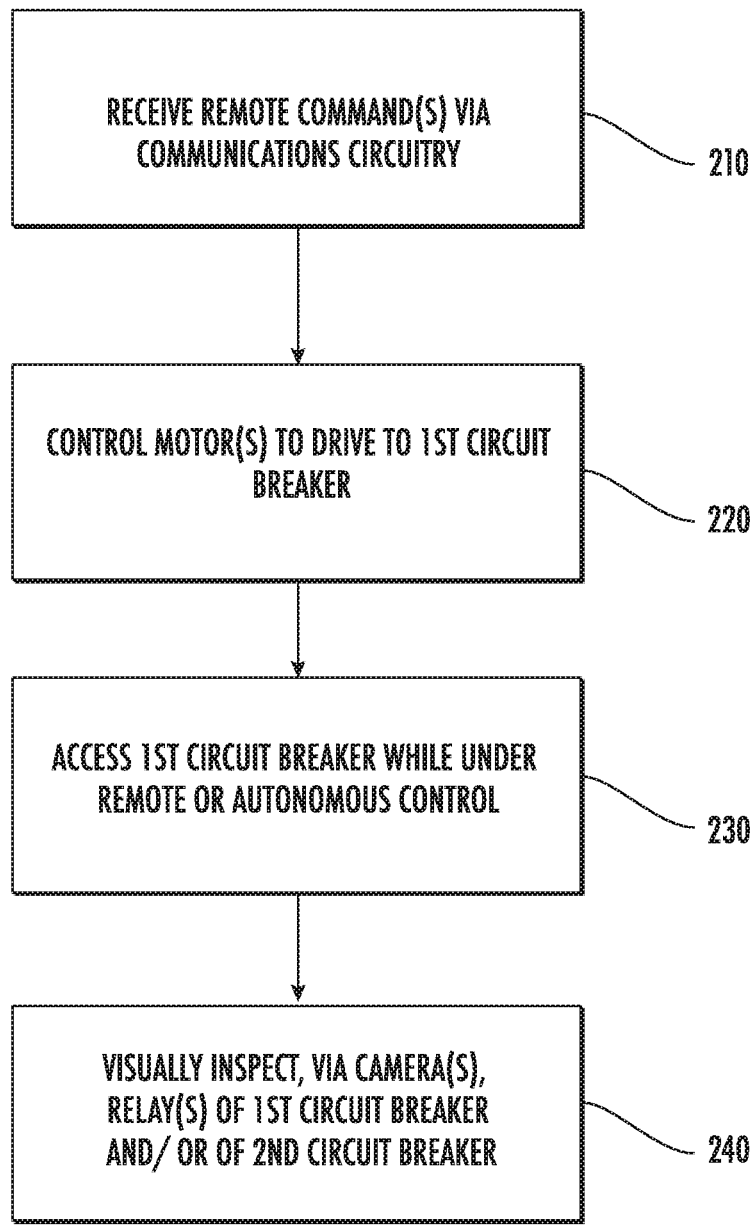
FIGS. 2A and 2B are flowcharts illustrating operations of a robotic breaker-racking apparatus according to various embodiments of present inventive concepts.

Referring to FIG. 2A, operations of a robotic breaker-racking apparatus 100 according to various embodiments of present inventive concepts may include controlling one or more motor(s) 110 to drive (Block 220) the robotic breaker-racking apparatus 100 to a first circuit breaker 120-1. For example, a human operator 130 may remotely control the motor(s) 110 via an electronic device 135, such as a smartphone, a tablet computer, a laptop computer, or a desktop computer. Accordingly, the operations may also include receiving (Block 210) one or more remote commands via communications circuitry 140 of the robotic breaker-racking apparatus 100, and the operation(s) of Block 220 may be performed in response to the remote command(s). For example, the remote command(s) of Block 210 may include a plurality of directional commands, such as turn right, turn left, swing turn right, swing turn left, drive forward, and/or or drive in reverse. (A swing turn is a type of turn in a close-quarters environment where only one side of the wheels turn and the opposing side remains stationary to pivot.) Accordingly, the operations of Blocks 210 and 220 may, in some embodiments, occur in parallel.

As another example, in some embodiments, the operation(s) of Block 220 may be performed autonomously (i.e., without any user input). For example, the robotic breaker-racking apparatus 100 may identify the location of the first circuit breaker 120-1 using a predetermined map of the plurality of circuit breakers 120, and may use the map to navigate to the first circuit breaker 120-1. As an example, such autonomous travel of the robotic breaker-racking apparatus 100 may be triggered by a single remote command in Block 210 to travel to the first circuit breaker 120-1. Alternatively, the operation(s) of Block 210 may be omitted entirely, and the autonomous travel may be performed in response to a sensor, such as a camera 150 of the robotic breaker-racking apparatus 100, detecting a potential issue with the first circuit breaker 120-1.

Regardless of whether the robotic breaker-racking apparatus 100 navigates autonomously or in response to a remote human operator 130, it will be understood that the first circuit breaker 120-1 may be inside a switchgear room 171 of a generating station or a substation 170 of an electric utility. Accordingly, referring also to FIG. 1A, the operation(s) of Block 220 may include controlling travel of the robotic breaker-racking apparatus 100 from a first location 172-1 within the switchgear room 171 to a second location 172-2 within the switchgear room 171. For example, the robotic breaker-racking apparatus 100 may already be inside the switchgear room 171 when it (a) receives (Block 210) remote command(s) or (b) detects a potential issue via a sensor. Moreover, it will be understood that the operation(s) of any block of any flowchart herein may be performed while the human operator 130 is completely outside of the switchgear room 171, or is outside of a particular aisle 173 of the switchgear room 171 that includes the first circuit breaker 120-1.

Referring still to FIG. 2A, the robotic breaker-racking apparatus 100 may access (Block 230) the first circuit breaker 120-1 via remote or autonomous control of the robotic breaker-racking apparatus 100. For example, the robotic breaker-racking apparatus 100 may remove one or more panels (e.g., a door 122) covering the first circuit breaker 120-1 and/or may perform one or more racking operations for the first circuit breaker 120-1. In some embodiments, before accessing (Block 230) the first circuit breaker 120-1, a human operator 130, who is controlling/observing the robotic breaker-racking apparatus 100 via an electronic device 135, may confirm via user input(s) to the electronic device 135 that the human operator 130 is in a safe location and/or has remotely locked the wheel(s) 510 (FIG. 5A), and/or remotely set a braking system, of the robotic breaker-racking apparatus 100. Until receiving such confirmation, the accessing operation(s) of Block 230 may be limited or even prevented (e.g., blocked by a processor 110). Accordingly, the accessing operation(s) of Block 230 may, in some embodiments, be enabled in response to such confirmation.

Moreover, the robotic breaker-racking apparatus 100 may visually inspect (Block 240), via one or more cameras 150 of the robotic breaker-racking apparatus 100, one or more relays 160 of the first circuit breaker 120-1 and/or one or more relays 160 of a second circuit breaker 120-2. Such visual inspection(s) of Block 240 may be performed before, during, and/or after the operations of Blocks 210-230. For example, the robotic breaker-racking apparatus 100, while equipped with the camera(s) 150, can drive down an aisle 173 in a room 171 with breakers 120 and scan the relays 160 throughout the room 171 to determine what state they are in, instead of having a human operator 130 in the presence of the breakers 120.

If, on the other hand, the robotic breaker-racking apparatus 100 is used only when needed to push a trip button 124 for training and live scenarios, then the robotic breaker-racking apparatus 100 may sit idle 90% or more of the time. Accordingly, the operation(s) of Block 240 may increase utilization of the robotic breaker-racking apparatus 100. For example, when the robotic breaker-racking apparatus 100 is equipped with multiple cameras 150, it can visually inspect relays 160 even while it not moving. As an example, the robotic breaker-racking apparatus 100 may use the cameras 150 to visually inspect one or more relays 160 while the robotic breaker-racking apparatus 100 is stationary at the location 172-1 and/or at the location 172-2.

Additionally or alternatively, the inspection(s) of Block 240 may include thermally inspecting the first circuit breaker 120-1 and/or the second circuit breaker 120-2 via a thermal sensor/camera 150. By performing a thermal inspection, the robotic breaker-racking apparatus 100 can provide a valuable service, as regulations may require regular (e.g., once every few years) thermal inspections of equipment in the switchgear room 171. The thermal inspections performed by the robotic breaker-racking apparatus 100 may include looking for a temperature hot spot and, in response to detecting the hot spot, transmitting a job request to fix the hot spot via the communications circuitry 140. As a hot spot may be the result of arcing or another problem occurring in the switchgear room 171, the thermal inspections performed by the robotic breaker-racking apparatus 100 may protect both equipment in the switchgear room 171 and human operators 130.

Figure 2B:
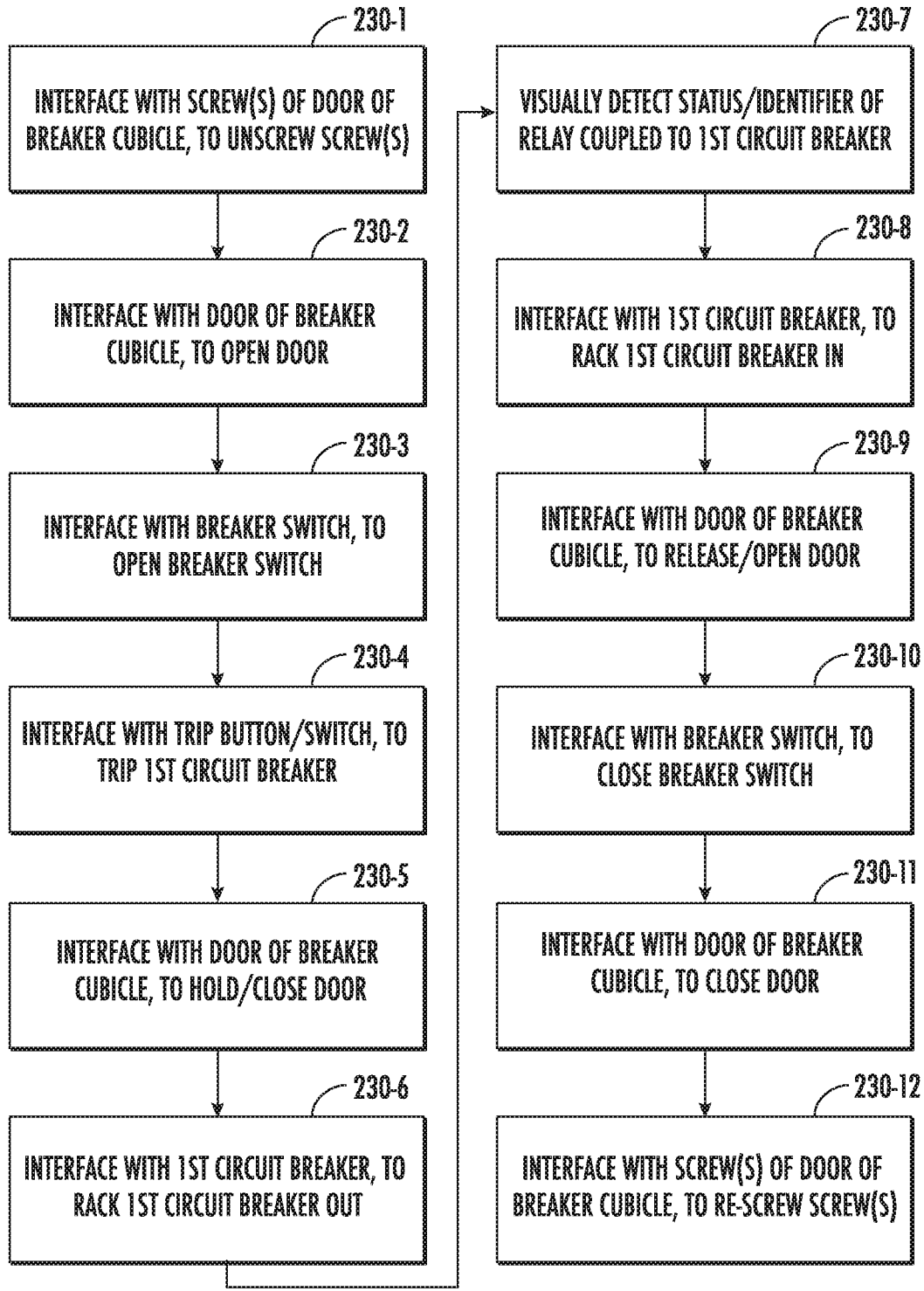

Referring now to FIG. 2B, the accessing (Block 230) operation(s) may include interfacing one or more mechanical components of the robotic breaker-racking apparatus 100 with the first circuit breaker 120-1, with a component electrically coupled to the first circuit breaker 120-1, and/or with a breaker cubicle 121 that houses the first circuit breaker 120-1. For example, the robotic breaker-racking apparatus 100 may interface (Block 230-2) with a door 122 of the breaker cubicle 121, to open the door 122. Additionally or alternatively, the robotic breaker-racking apparatus 100 may interface (Block 230-3) with a breaker switch 123 that is inside the breaker cubicle 121 and is coupled to the first circuit breaker 120-1, to open the breaker switch 123. As an example, the breaker switch 123 may be a knife switch. Moreover, the robotic breaker-racking apparatus 100 may interface (Blocks 230-6 and/or 230-8) with the first circuit breaker 120-1, to perform breaker racking (in and/or out) of the first circuit breaker 120-1.

Although it may be possible to provide each knife switch 123 with additional hardware/controls that enable remotely opening any knife switch 123, doing so may be cost prohibitive. For example, a single breaker-switching (switchgear) room 171 with two rows of circuit breakers 120 can have 20-40 knife switches 123. Accordingly, if a station/substation 170 includes three breaker switching rooms 171, it can have 100 or more knife switches 123, which can make remotely controlling the knife switches 123 with additional hardware/controls coupled to each knife switch 123 cost prohibitive.

In some embodiments, the robotic breaker-racking apparatus 100 may interface (Block 230-4) with a trip button/switch 124 of the first circuit breaker 120-1, to trip the first circuit breaker 120-1. For example, the robotic breaker-racking apparatus 100 may press, push, move, or otherwise actuate the trip button/switch 124 after interfacing (Block 230-3) with the breaker switch 123 and before interfacing (Blocks 230-6 and/or 230-8) with the first circuit breaker 120-1. Alternatively, the sequence of the blocks in FIG. 2B may change, and/or the operation(s) of Block 230-4 may be omitted altogether (e.g., if the first circuit breaker 120-1 has already tripped).

For example, in the case of a failed breaker coil, opening the breaker switch 123 may de-energize power going to the failed breaker coil. Moreover, pushing the trip button/switch 124 may release a mechanical spring that actuates clamps off of the bus bar 126, which may enable a circuit breaker 120 that is coupled to the failed breaker coil to be racked in or out.

In some embodiments, operation(s) of interfacing (Block 230-2) with the door 122, to open the door 122, may be preceded by interfacing (Block 230-1) the robotic breaker-racking apparatus 100 (e.g., via a screwdriver held thereby) with one or more screws 125 of the door 122, to unscrew the screw(s) 125. Additionally or alternatively, the robotic breaker-racking apparatus 100 may further interface (Block 230-5) with the door 122, to maintain a position of the door 122. For example, the robotic breaker-racking apparatus 100 may hold the door 122 in place, such as in a closed position. As an example, the robotic breaker-racking apparatus 100 may lock the door 122 in place by lifting a hinge linkage of the door 122.

The robotic breaker-racking apparatus 100 may further interface (Block 230-9) with the door 122, to release the door 122 from the position. For example, the robotic breaker-racking apparatus 100 may unlatch a lock that holds the door 122 in place, such as to move the door 122 from a closed position to an open position. Moreover, the robotic breaker-racking apparatus 100 may further interface (Block 230-11) with the door 122, to close the door 122. In some embodiments, after closing the door 122 in Block 230-11, the robotic breaker-racking apparatus 100 may further interface (Block 230-12) with the screw(s) 125, to re-screw the screw(s) 125 to hold the door 122 shut. As an example, two of the screws 125, which may be referred to herein as "door-latching screws," may be used to hold the door 122 shut.

Before closing the door 122 in Block 230-11, the robotic breaker-racking apparatus 100 may further interface (Block 230-10) with the breaker switch 123 to close the breaker switch 123. Moreover, before closing the breaker switch 123, the robotic breaker-racking apparatus 100 may interface (Block 230-6) with the first circuit breaker 120-1 to rack the first circuit breaker 120-1 out. For example, the robotic breaker-racking apparatus 100 may insert a socket (e.g., a ¾-inch socket) through a hole in the door 122 to push back a sleeve and turn a hex rod to rack the first circuit breaker 120-1 out.

As an example, a ¾" hex rod may be turned to rack the first circuit breaker 120-1, and a spring-loaded metal cylinder sleeve may surround the hex rod. The end of the sleeve may be flush with the end of the hex rod. Accordingly, with the breaker cubicle door 122 closed, a ratchet socket attached to the robotic breaker-racking apparatus 100 may be inserted through a hole 410 (FIG. 4B) in the door 122 to make contact with the sleeve. As the socket is pushed in farther, the sleeve retracts, thus allowing the socket to slide over the hex rod. For example, the hole 410 (FIG. 4B) may be a circular opening in the breaker cubicle door 122 next to a door hinge. On the inside of the door 122 are screws 125 (FIG. 1E) that may be unscrewed to open the breaker cubicle 121.

After racking the first circuit breaker 120-1 out, the robotic breaker-racking apparatus 100 may use a camera 150 to visually detect (Block 230-7) a status and/or identifier of a relay 160 that is coupled to the first circuit breaker 120-1. For example, the camera 150 may detect a label (e.g., a red label) of the relay 160 through a cover (e.g., a glass cover) of the relay 160.

Moreover, the robotic breaker-racking apparatus 100 may interface (Block 230-8) with a circuit breaker 120 (e.g., a second or third circuit breaker) to rack the circuit breaker 120 into the position where the first circuit breaker 120-1 had been inside the breaker cubicle 121 before it was racked out. Accordingly, it will be understood that such racking in may include replacing the first circuit breaker 120-1 that was racked out with a new/different circuit breaker 120.

As used herein, the term "interfacing with" (or "interface with") refers to physically contacting/actuating, or otherwise mechanically coupling to, an object. As an example, the robotic breaker-racking apparatus 100 may include one or more mechanical appendages 180, such as a mechanical claw 180C (FIGS. 5D/5E/5J/5L) or a humanoid hand 180H (FIG. 5K), configured to interface with components of the switchgear room 171.

Figure 3:
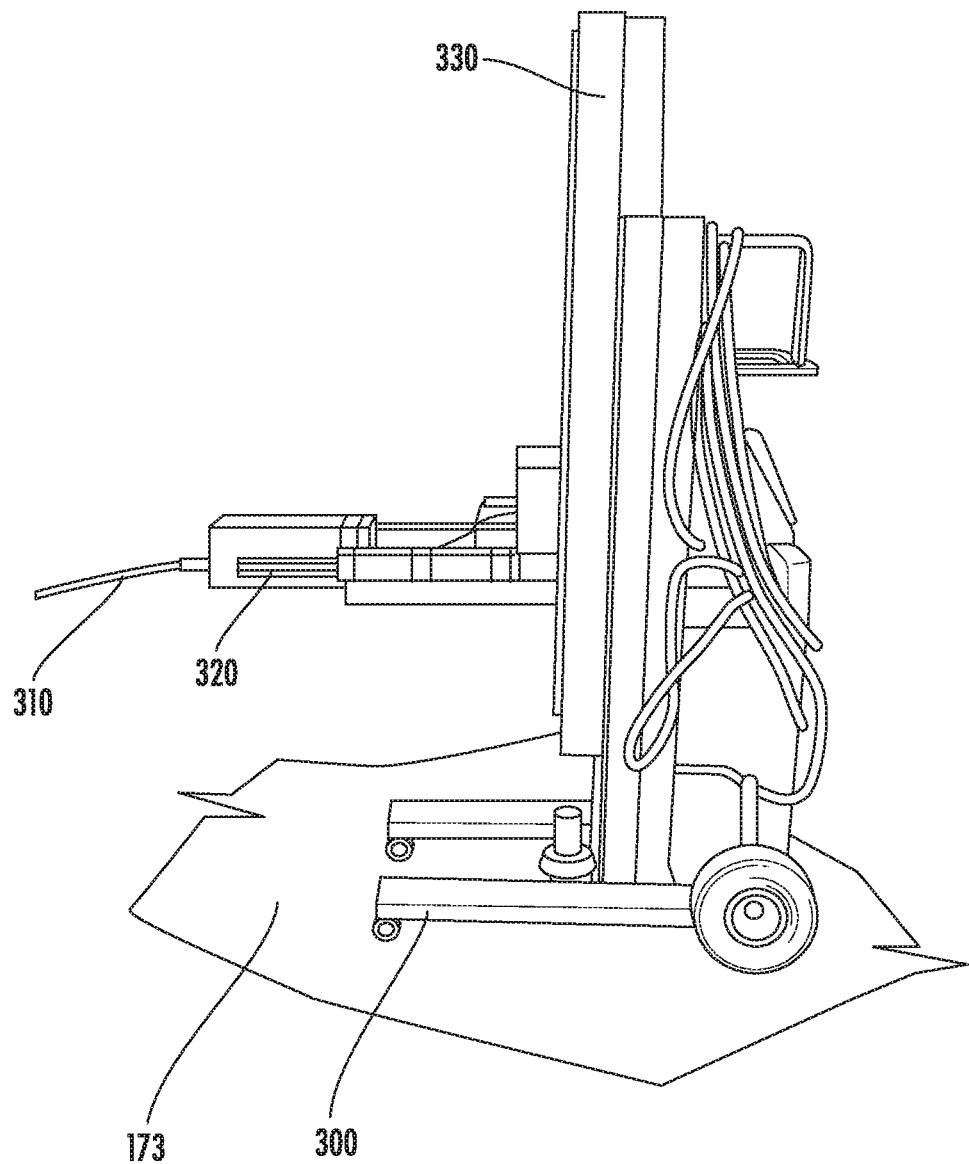
FIG. 3 illustrates a prior-art, manual breaker-racking apparatus in an aisle of a switchgear room.

Referring now to FIG. 3, a prior-art, manual breaker-racking apparatus 300 is illustrated in an aisle 173 of a switchgear room 171. The manual breaker-racking apparatus 300 may include one or more tools 310 for accessing and/or racking a circuit breaker 120. For example, the tool(s) 310 may include an electronic wrench. Because the manual breaker-racking apparatus 300 is a manual system/device, however, a human operator 130 still needs to stand in front of an open cabinet/cubicle 121 to align and/or attach the tool(s) 310 (e.g., a socket). Accordingly, the manual breaker-racking apparatus 300 exposes the human operator 130 to risk, including the risk of an arc flash that may occur in the vicinity of the circuit breaker 120.

The human operator 130 also must manually push the manual breaker-racking apparatus 300 from one location to another inside the switchgear room 171. In contrast, the robotic breaker-racking apparatus 100 according to various embodiments of present inventive concepts may transmit real-time images (e.g., a live video feed) from its camera(s) 150 to an electronic device 135 of the human operator 130 via the communications circuitry 140 to facilitate remotely-controlled driving of the robotic breaker-racking apparatus 100 inside the switchgear room 171 by the human operator 130. Alternatively, the robotic breaker-racking apparatus 100 may use real-time images from its camera(s) 150 to facilitate autonomous driving inside the switchgear room 171. Moreover, the manual breaker-racking apparatus 300, in contrast with the robotic breaker-racking apparatus 100, may be incapable of various operations of FIG. 2B, including operations involving interfacing with the screw(s) 125 and/or the door 122 of the breaker cubicle 121.

Referring still to FIG. 3, a tool 310 may be attached to a horizontal arm 320 of the manual breaker-racking apparatus 300. The horizontal arm 320 may be attached to a vertical arm 330 of the manual breaker-racking apparatus 300, and may thus move vertically up or down when the vertical arm 330 moves vertically up or down.

Figure 4A:
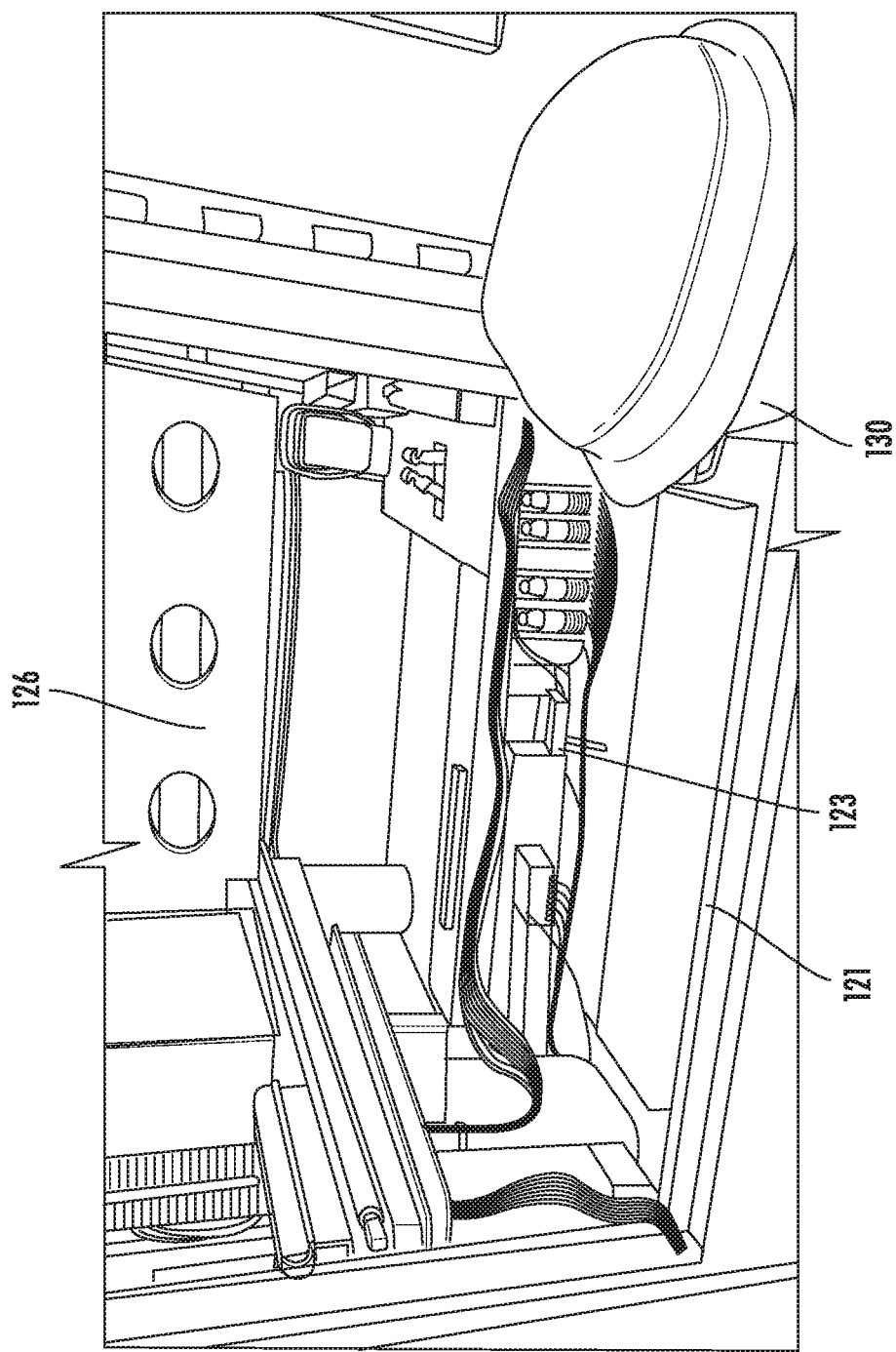
FIG. 4A illustrates a prior-art, manual operation of accessing the inside of a breaker cubicle.

Referring now to FIG. 4A, a prior-art, manual operation of accessing the inside of a breaker cubicle 121 is illustrated. In this manual operation, a human operator 130 views the inside of the breaker cubicle 121, including an AC bus bar 126 and a breaker switch 123 that is opened by the human operator 130. In particular, FIG. 4A illustrates that the breaker switch 123 is a knife switch that the human operator 130 has manually opened.

Figure 4B:
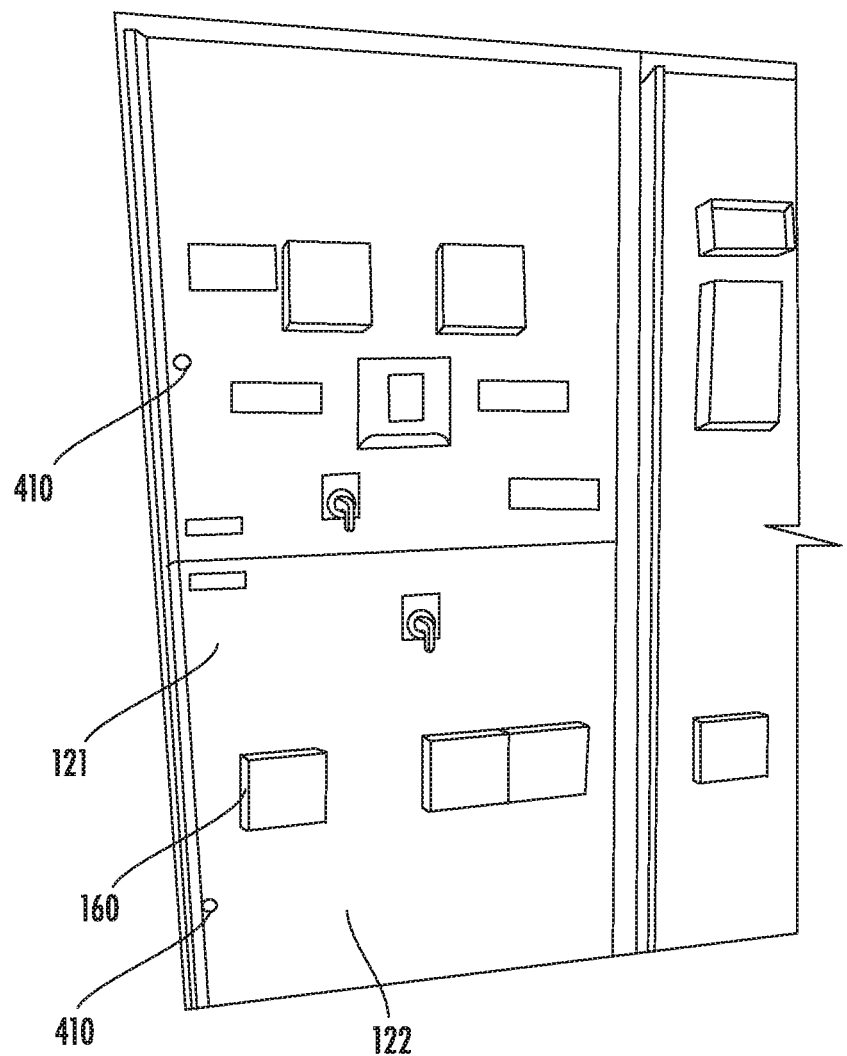
FIG. 4B illustrates an exterior view of a breaker cubicle.

Referring now to FIG. 4B, an exterior view of a breaker cubicle 121 is illustrated. In this view, the breaker cubicle 121 is in a stack and includes a door 122 having at least one relay 160 thereon. The breaker cubicle 121 and the relay(s) 160 thereon may be commercially-available items.

Figure 4C:
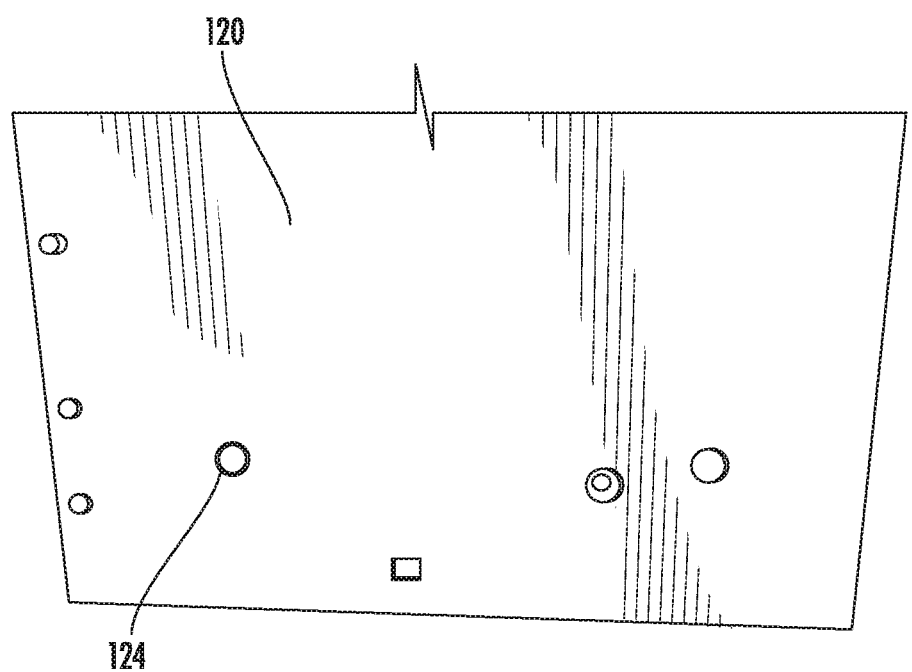
FIG. 4C illustrates a view of a push-button that can be pushed to trip a breaker.

Referring now to FIG. 4C, a view of a push-button 124 is illustrated. The push-button 124 can be pushed to trip a breaker 120 that is coupled thereto. A robotic breaker-racking apparatus 100 according to various embodiments of present inventive concepts can push the push-button 124 without requiring a human operator 130 in front of the breaker 120.

Figure 5A:
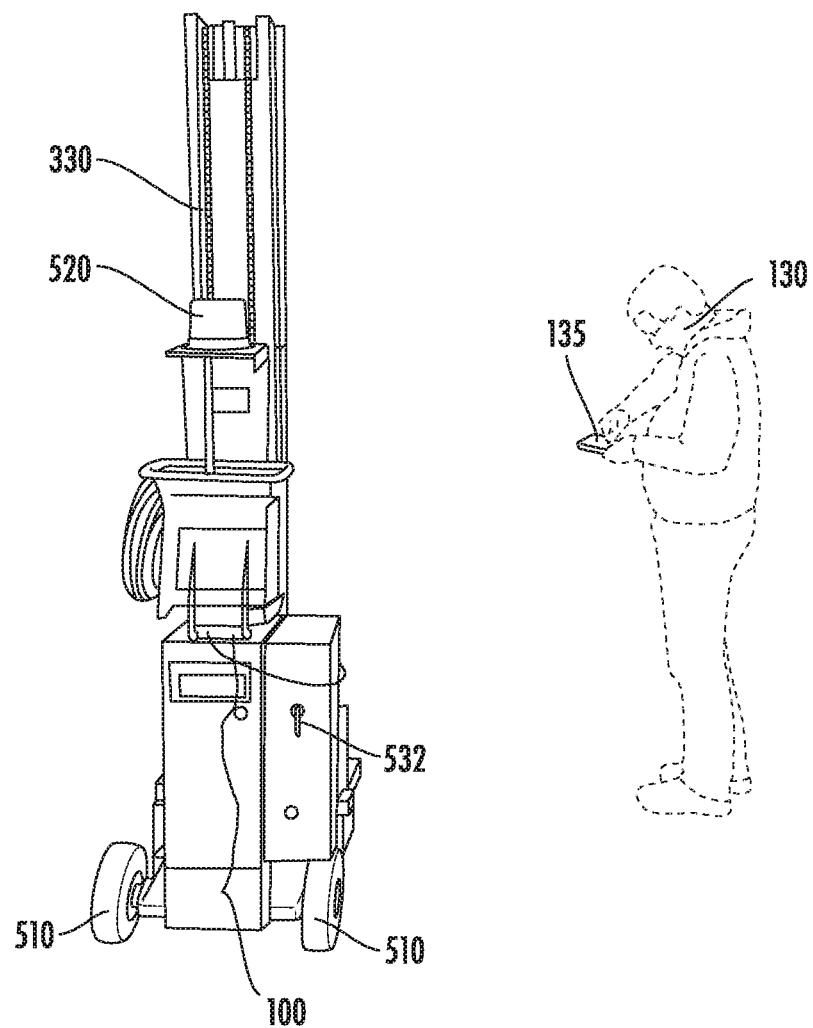
FIG. 5A is a rear view of a robotic breaker-racking apparatus according to various embodiments of present inventive concepts.

Referring now to FIG. 5A, a rear view of a robotic breaker-racking apparatus 100 according to various embodiments of present inventive concepts illustrates that the robotic breaker-racking apparatus 100 may have one or more wheels 510. As an example, the robotic breaker-racking apparatus 100 may be a differential-drive robot with three or more wheels (e.g., four wheels 510.

The wheel(s) 510 may be powered by one or more motors 110 to propel the robotic breaker-racking apparatus 100. For example, in some embodiments, the robotic breaker-racking apparatus 100 may have three, four, or more of the powered wheels 510. Additionally or alternatively, the robotic breaker-racking apparatus 100 may be propelled via a continuous track system, such as one, two, or three continuous bands of treads or track plates.

Moreover, FIG. 5A also illustrates a wireless electronic device 135 that a human operator 130 can use to remotely control any of the operations of FIGS. 2A and 2B. In some embodiments, the robotic breaker-racking apparatus 100 may include a vertical arm 330 that moves vertically up or down under automated control or under remote control by the human operator 130 via a wireless electronic device 135. The vertical arm 330 may have a horizontal arm 320 (FIG. 3) attached thereto, and may thus move the horizontal arm 320 vertically up or down. Additionally or alternatively, the robotic breaker-racking apparatus 100 may include a switch 532, which may be a key switch that the human operator 130 can operate via a key to turn on/off power to the robotic breaker-racking apparatus 100.

The size of the robotic breaker-racking apparatus 100 may be substantial. For example, the robotic breaker-racking apparatus 100 may weigh hundreds of pounds (e.g., about 450 pounds), may be about 40 inches deep, and may extend up to about 8 feet in height. Accordingly, in some embodiments, the robotic breaker-racking apparatus 100 may include a light 520 or other warning system providing a visible and/or audible warning to any person who may be near the robotic breaker-racking apparatus 100.

Figure 5B:
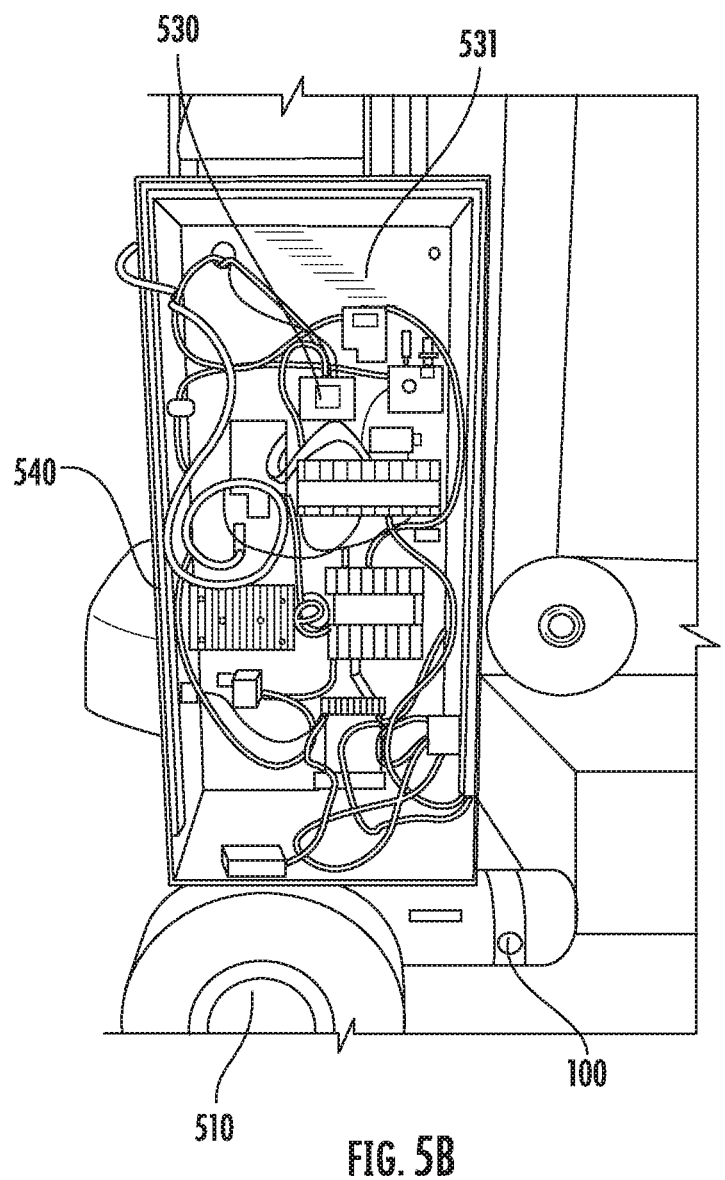
FIG. 5B is a side view illustrating communications and control circuitry on the robotic breaker-racking apparatus of FIG. 5A.

Referring now to FIG. 5B, a side view of the robotic breaker-racking apparatus 100 illustrates that the robotic breaker-racking apparatus 100 includes various communications and control circuitry 530, which may be inside an enclosure/housing 531. The communications and control circuitry 530 may include, for example, the communications circuitry 140 and the processor(s) 190 illustrated in FIG. 1C. The processor(s) 190 and/or other control circuitry among the communications and control circuitry 530 can control operations of the motor(s) 110. The robotic breaker-racking apparatus 100 may also include a braking system to stop or slow movement of the wheels 510. In some embodiments, the braking system and/or motor(s) 110 coupled to the wheels 510 may be remotely controlled to lock the wheels 510. In contrast, the manual breaker-racking apparatus 300 of FIG. 3 may have a manual clamp above each tire that must be manually clamped down to provide braking/locking, thus potentially putting a human operator 130 in front of a malfunctioning breaker 120. Moreover, in some embodiments, the robotic breaker-racking apparatus 100 may include lights 540 that are on and/or are inside a housing that contains the communications and control circuitry 530.

Figure 5C:
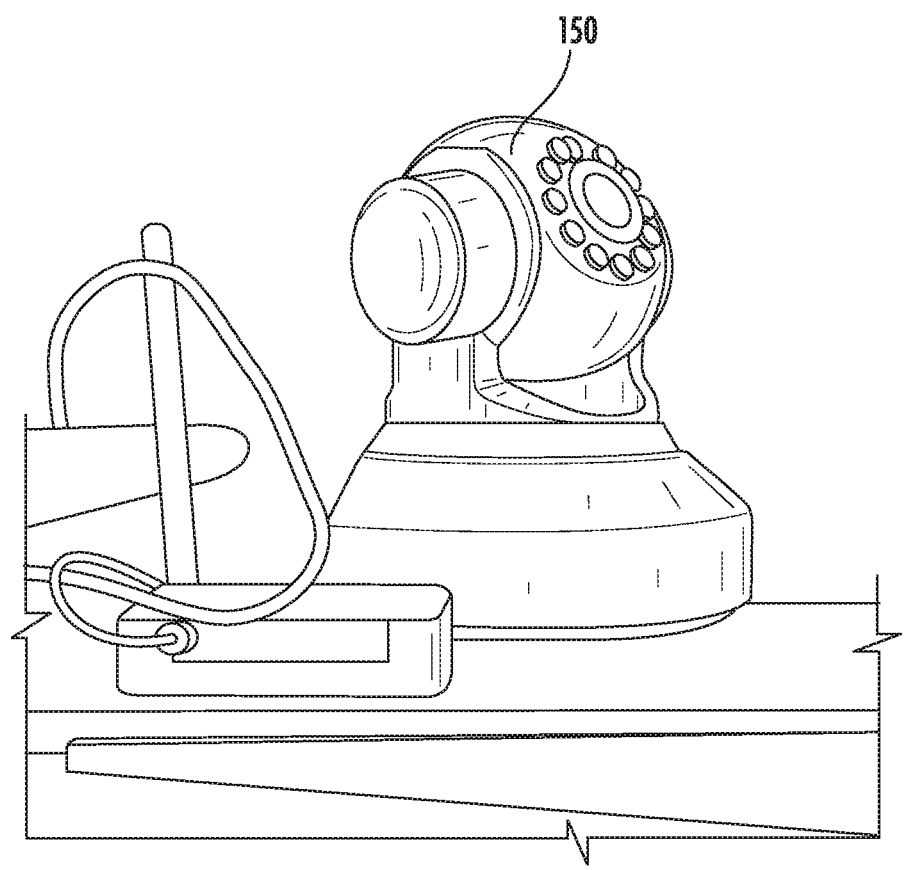
FIG. 5C illustrates an example of a camera that may be on a robotic breaker-racking apparatus according to various embodiments of present inventive concepts.

Referring now to FIG. 5C, an example of a camera 150 that may be on the robotic breaker-racking apparatus 100 is illustrated. The camera 150 may be coupled to the communications circuitry 140 so that the camera 150 may be remotely controlled and/or may transmit video and/or still images to one or more electronic devices, such as an electronic device 135 of a human operator 130.

Figure 5D:
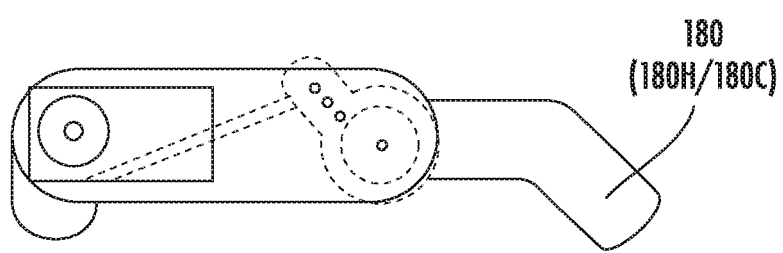
FIG. 5D illustrates a schematic diagram of a mechanical appendage that is configured to access a circuit breaker via remote or autonomous control according to various embodiments of present inventive concepts.
Figure 5E:
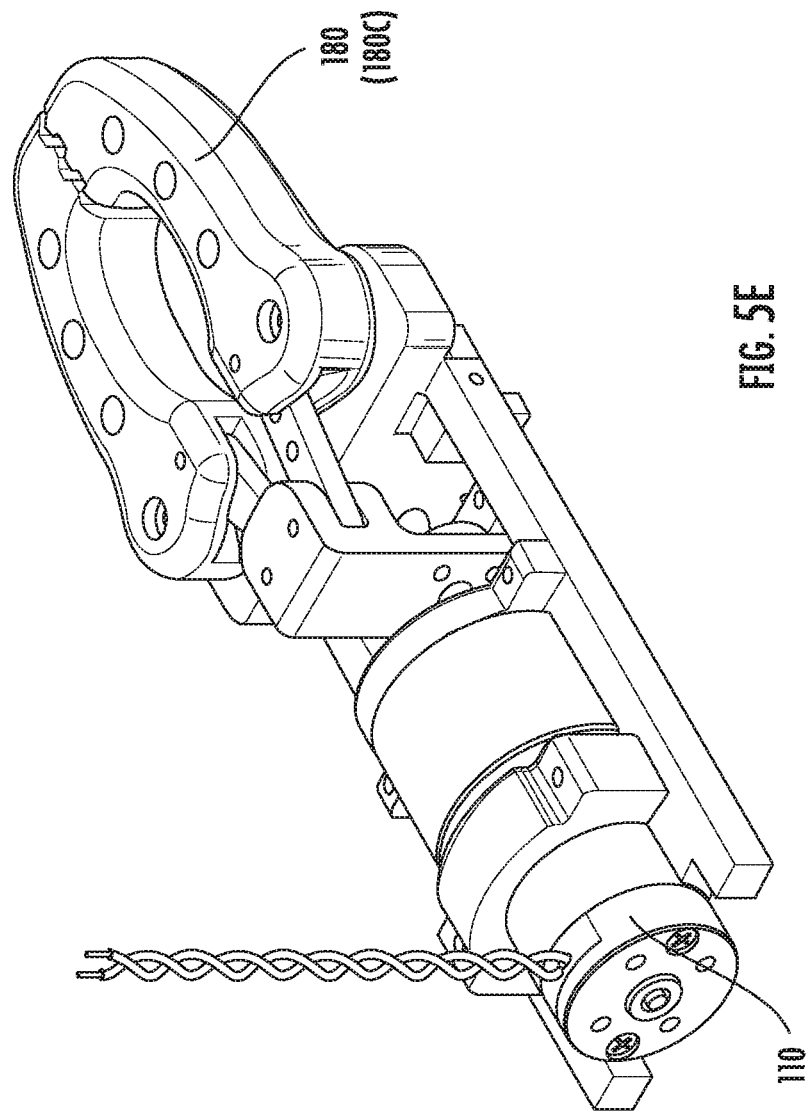
FIG. 5E is a perspective view of a claw that is configured to access a circuit breaker via remote or autonomous control according to various embodiments of present inventive concepts.

Referring now to FIGS. 5D and 5E, examples of a mechanical appendage 180 of the robotic breaker-racking apparatus 100 according to various embodiments of present inventive concepts are illustrated. The appendage 180, such as a mechanical claw 180C, may be configured to grasp/open the door 122 of the breaker cabinet/cubicle 121, to open/close the switch 123, to push the button/switch 124, to push another button, and/or to push/close the door 122.

The appendage 180 may have a plurality of joints and may be controlled by one or more motors/actuators. For example, the claw 180C may have two joints and may be controlled by a single motor 110 or other single actuator. As an example, a single motor 110 may simultaneously control lower and upper pincher/finger portions of the claw 180C. Moreover, a rigid rod can cause an upper portion of a pincher/finger to pivot clockwise.

In contrast with using the claw 180C of the robotic breaker-racking apparatus 100 to grab the switch 123, a conventional breaker-racking unit, such as the manual breaker-racking apparatus 300 of FIG. 3, has no need for a mechanical claw because the manual breaker-racking apparatus 300 of FIG. 3 is used by a human operator 130 who stands in front of, and can grab, the switch 123.

Figure 5F:
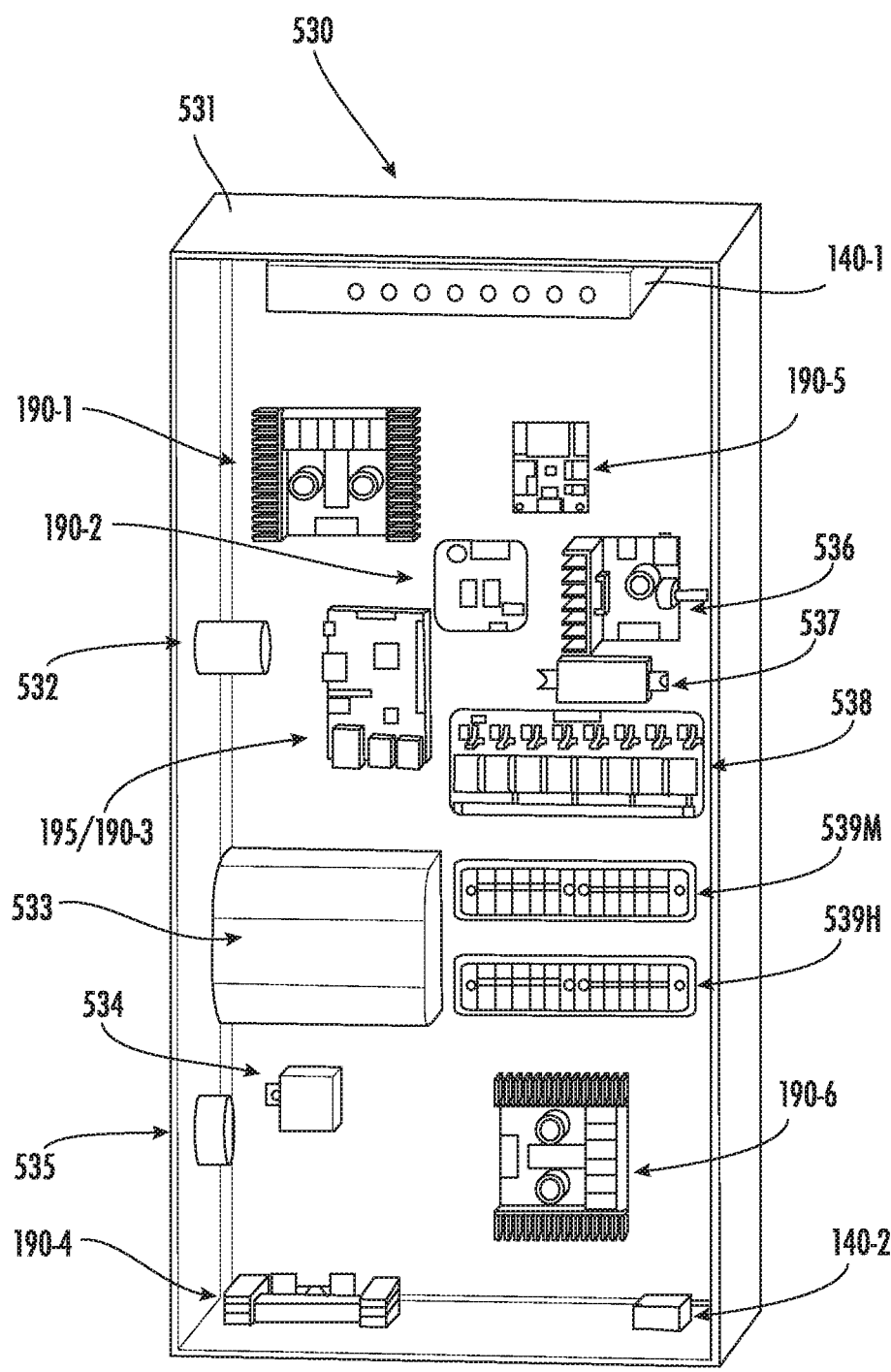
FIG. 5F is a perspective view of an enclosure/housing that includes various communications and control circuitry of a robotic breaker-racking apparatus according to various embodiments of present inventive concepts.

Referring now to FIG. 5F, a perspective view of an enclosure/housing 531 illustrates a detailed example of various communications and control circuitry 530 of the robotic breaker-racking apparatus 100 according to various embodiments of present inventive concepts. For example, the communications and control circuitry 530 inside the enclosure/housing 531 may include a plurality of processors 190, such as a processor 190-1 that is configured to control a motor 110 coupled to a humanoid (i.e., robotic) hand 180H (FIG. 5K), including control of a thumb and/or one or more fingers of the hand 180H. As an example, the processor 190-1 may provide two-channel control such that a thumb may be controlled independently of fingers, and vice versa. Moreover, the processors 190 may include a processor 190-2 that is configured to control a motor 110 coupled to a vertical arm 330 of the robotic breaker-racking apparatus 100.

The communications and control circuitry 530 may include an embedded system/computer, which may be provided by a memory 195 and processor 190-3 that may be coupled to each other as illustrated in FIG. 1D. The memory 195 of the embedded system/computer may include custom software for operating the robotic breaker-racking apparatus 100, including custom software for performing any of the operations of FIGS. 2A and 2B. The custom software may be provided using one or more programming languages, including Python.

Moreover, the communications and control circuitry 530 may, in some embodiments, include a processor 190-4 that is configured to control a motor 110. Additionally or alternatively, the communications and control circuitry 530 may include a processor 190-5 that is configured to control a motor 110 that is coupled to a horizontal arm 320 of the robotic breaker-racking apparatus 100. For example, a hand 180H (FIG. 5K) may be attached to the horizontal arm 320, and the processor 190-5 may be configured to control a motor 110 to move the hand 180H in and out of a breaker cubicle 121. In particular, the processor 190-5 is configured to control lateral, forward/reverse, and/or rotational movement of the horizontal arm 320. Also, the communications and control circuitry 530 may include a processor 190-6 that is configured to control a motor 110 that propels the robotic breaker-racking apparatus 100, such as by propelling one or more wheels 510. For example, the processor 190-6 may provide multi-channel control such that power to different wheels 510 and/or different tracks/treads is controlled independently. In some embodiments, each motor 110 may be coupled to a respective processor 190. Alternatively, an individual processor 190 may be configured to control more than one motor 110. Accordingly, two or more of the processors 190 in FIG. 5F may, in some embodiments, be combined.

In some embodiments, the enclosure/housing 531 may include a switch 532, such as a key switch, by which a human operator 130 can turn on/off power to the robotic breaker-racking apparatus 100. For example, the switch 532 may be accessible by the human operator 130, such as via a key hole that is on an external surface of the enclosure/housing 531. Moreover, the switch 532 may be electrically coupled to, and configured to trigger, a safety device 534. As an example, turning the switch 532 on/off may provide a signal/command to the safety device 534 to turn on/off power to the robotic breaker-racking apparatus 100. The switch 532 and the safety device 534 may be spaced apart from each other (e.g., by at least 6 inches), to electrically isolate human operator 130 from battery power (of the robotic breaker-racking apparatus 100) when the human operator 130 is contacting the switch 532. The safety device 534 may be, for example, a pull-in relay (PIR).

Moreover, the communications and control circuitry 530 may include a power conditioner 533, which may be configured to perform a voltage stepdown for one or more batteries 560 (FIG. 5G) of the robotic breaker-racking apparatus 100. Such a voltage stepdown may protect electronics within the communications and control circuitry 530. As an example, the power conditioner 533 may be referred to as a "medium voltage power conditioner" and may be configured to step 24 Volts down to 12 Volts. For example, the robotic breaker-racking apparatus 100 may include two 12-Volt batteries that are coupled to each other in series and are coupled to the power conditioner 533 to provide a 24-Volt input. Additionally or alternatively, the power conditioner 533 may be configured to provide thermal protection for the robotic breaker-racking apparatus 100.

The enclosure/housing 531 may, in some embodiments, include a battery charging port 535. The battery charging port 535 may connect one or more batteries 560 (FIG. 5G) of the robotic breaker-racking apparatus 100 to a battery charger that is on the robotic breaker-racking apparatus 100. For example, two 12-Volt batteries that are coupled to the power conditioner 533 may also be coupled to the battery charging port 535, to charge those batteries.

The communications and control circuitry 530 may include communications circuitry 140, such as an onboard network 140-1 that is configured to provide communications for camera(s) 150 (e.g., video communications). As an example, the onboard network 140-1 may include a Radio Frequency (RF) transmitter that is configured to transmit video, or other data detected by the camera(s) 150, to an electronic device 135 of a human operator 130. Additionally or alternatively, the onboard network 140-1 may be configured to provide communications for all functions of the robotic breaker-racking apparatus 100 other than propulsion. For example, the onboard network 140-1 may include an RF receiver that is configured to receive remote commands from the electronic device 135 of the human operator 130 to control operations of the camera(s) 150 and/or one or more of the processors 190-1, 190-2, 190-3, 190-4, and 190-5. As an example, the human operator 130 may provide a remote command via the onboard network 140-1 to apply brakes (and/or to control motor(s) 110) of the robotic breaker-racking apparatus 100, to keep the robotic breaker-racking apparatus 100 from rolling/sliding after it is in front of a breaker cubicle 121. The communications circuitry 140 may also include an RF receiver 140-2 (e.g., a second RF receiver) that is configured to receive remote commands from the electronic device 135 of the human operator 130 to control operations of the processor 190-6 for propulsion of the robotic breaker-racking apparatus 100.

In some embodiments, the communications and control circuitry 530 may include an audio amplifier 536 that is coupled to a speaker 521 (FIG. 5G) and is configured to facilitate announcements, such as audible warnings that the robotic breaker-racking apparatus 100 is moving. Moreover, the communications and control circuitry 530 may include a plurality of toggles/switches 538 that may be coupled to lighting, braking, and/or other components of the robotic breaker-racking apparatus 100. As an example, the toggles/switches 538 may include an 8-channel relay.

In some embodiments, a power conditioner 537, such as a 5-Volt power conditioner, may power the embedded system/computer that is provided by the memory 195 and processor 190-3. Additionally or alternatively, a medium-voltage power bus 539M may be configured to distribute medium-voltage (e.g., 12 Volts) power and a high-voltage power bus 539H may be configured to distribute high-voltage (e.g., 24 Volts) power. For example, the power bus 539H may have an input coupled to two 12-Volt batteries, and the power bus 539M may have an input coupled to the power conditioner 533. Furthermore, the power buses 539M, 539H may have outputs coupled to components of the communications and control circuitry 530 as well as to other components of the robotic breaker-racking apparatus 100. Accordingly, the power buses 539M, 539H may distribute power to propel the robotic breaker-racking apparatus 100, to operate the arms 320, 330, to operate the camera(s) 150, and to communicate via the communications circuitry 140.

Figure 5G:
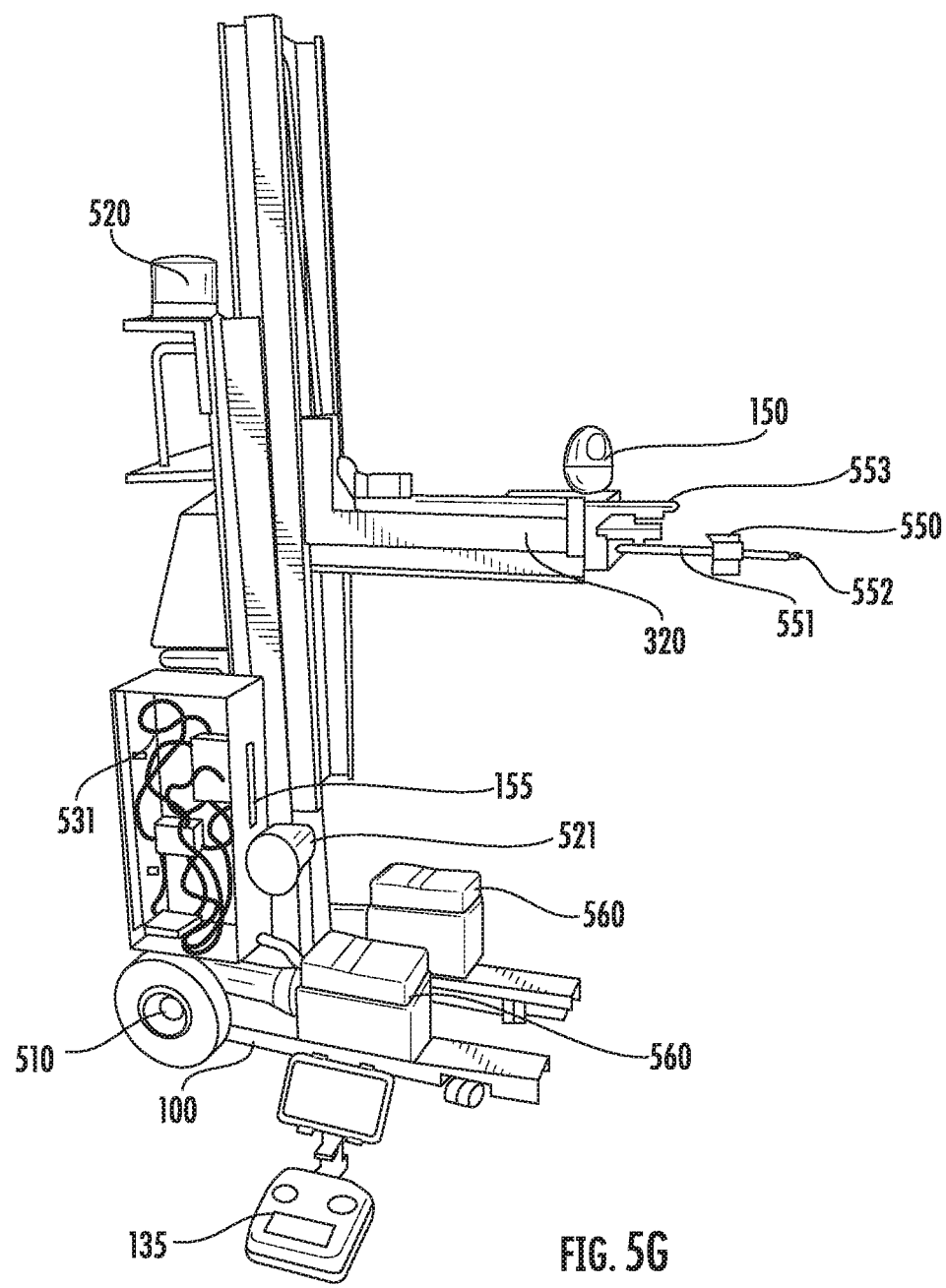
FIG. 5G is a side view of the robotic breaker-racking apparatus of FIG. 5A.

Referring now to FIG. 5G, a side view is illustrated of the robotic breaker-racking apparatus 100 according to various embodiments of present inventive concepts. FIG. 5G shows two batteries 560 that can power various functions of the robotic breaker-racking apparatus 100. FIG. 5G also shows a horizontal arm 320 with a linear actuator 553 attached thereto. A rod may extend from the linear actuator 553 and may be used to reach into a breaker cubicle 121. For example, a humanoid hand 180H (FIG. 5K) may be attached to the linear actuator 553. Additionally or alternatively, the front of the robotic breaker-racking apparatus 100 may include an external light 155 (e.g., one or more LED lights) that can be used to, for example, illuminate the interior and/or exterior of a breaker cabinet 121. Moreover, FIG. 5G shows a camera 150, a warning light 520 on the back of the robotic breaker-racking apparatus 100, a controls box (or other enclosure/housing) 531, a right-side motorized wheel 510, a speaker 521, and an electronic device 135. The electronic device 135 may include, for example, a remote controller interface and/or a tablet screen that can be used to observe/control operations of the robotic breaker-racking apparatus 100.

FIG. 5G also illustrates an extension rod 551 that extends forward from the horizontal arm 320 and has a tip/end 552 that is configured to push a trip button 124 of a breaker 120. The extension rod 551 may have one or more lasers 550 attached thereto. Accordingly, the laser(s) 550 may be used to help guide the tip/end 552, whose position/orientation may be remotely controlled by the human operator 130, to the trip button 124. In some embodiments, the laser(s) 550 may include one or more red lasers.

Figure 5H:
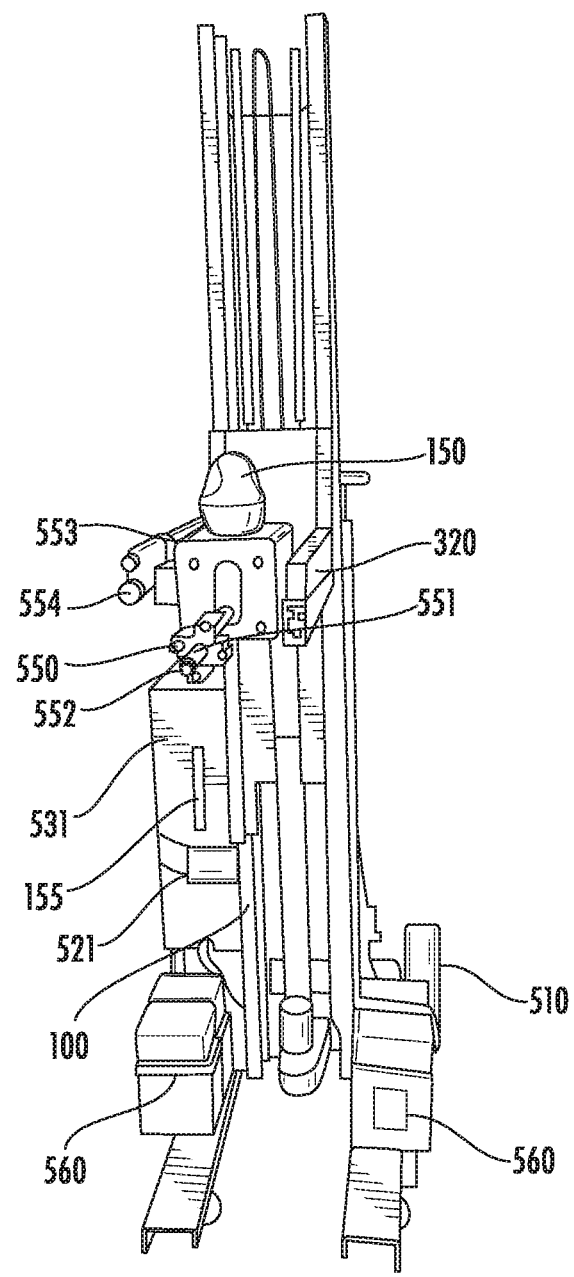
FIG. 5H is a front view of the robotic breaker-racking apparatus of FIG. 5A.

Referring now to FIG. 5H, a front view is illustrated of the robotic breaker-racking apparatus 100 according to various embodiments of present inventive concepts. FIG. 5H shows two batteries 560, a horizontal arm 320 with a linear actuator 553 and a laser 554 attached thereto, a camera 150, an external light 155, a speaker 521, an extension rod 551 with laser(s) 550 attached thereto, and a left-side motorized wheel 510.

In some embodiments, the laser 554 and/or the laser(s) 550 may provide a guidance system for targeting/navigation of the robotic breaker-racking apparatus 100. The guidance system may also include, for example, the camera 150 and/or an electronic device 135 that a human operator 130 may use to remotely control the robotic breaker-racking apparatus 100. In some embodiments, the guidance system may be a laser-guidance system including one or more red lasers 550 that can help guide the human operator 130 to a push-button 124 and one green laser 554 that can help guide the human operator 130 to a knife switch 123. As illustrated in FIGS. 5G and 5H, the guidance system may be attached to the front of the robotic breaker-racking apparatus 100. Moreover, as illustrated in FIG. 5H, the laser-guidance system may, in some embodiments, include four red lasers 550. Alternatively, one, two, three, five, or more lasers 550 can be used.

Figure 5I:
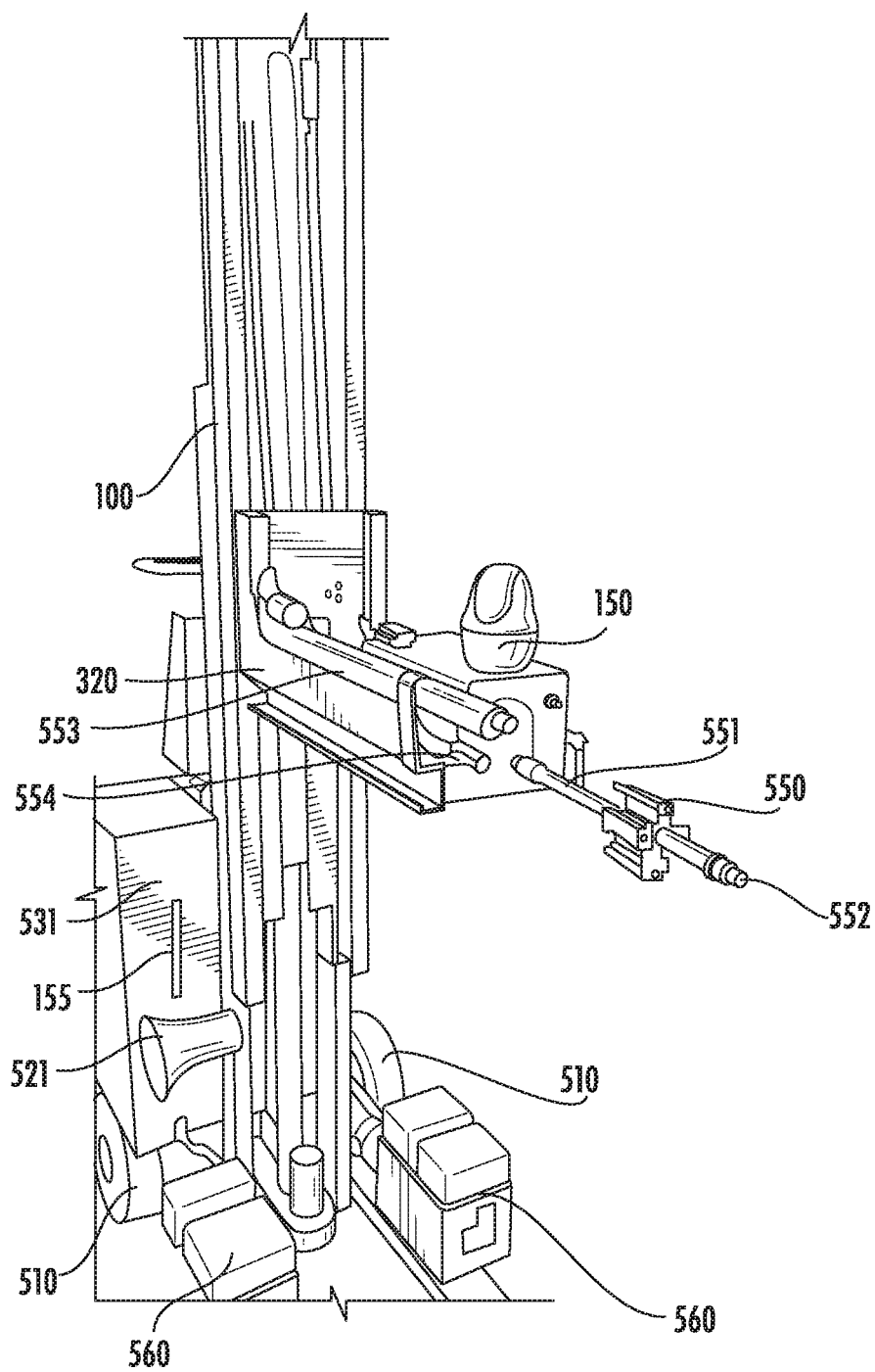
FIG. 5I is a front perspective view of the robotic breaker-racking apparatus of FIG. 5A.

Referring now to FIG. 5I, a front perspective view is illustrated of the robotic breaker-racking apparatus 100 according to various embodiments of present inventive concepts. FIG. 5I shows two batteries 560, a horizontal arm 320 with a linear actuator 553 and laser 554 attached thereto, a camera 150, an external light 155, an extension rod 551 with laser(s) 550 attached thereto, a speaker 521, and two motorized wheels 510.

Figure 5J:
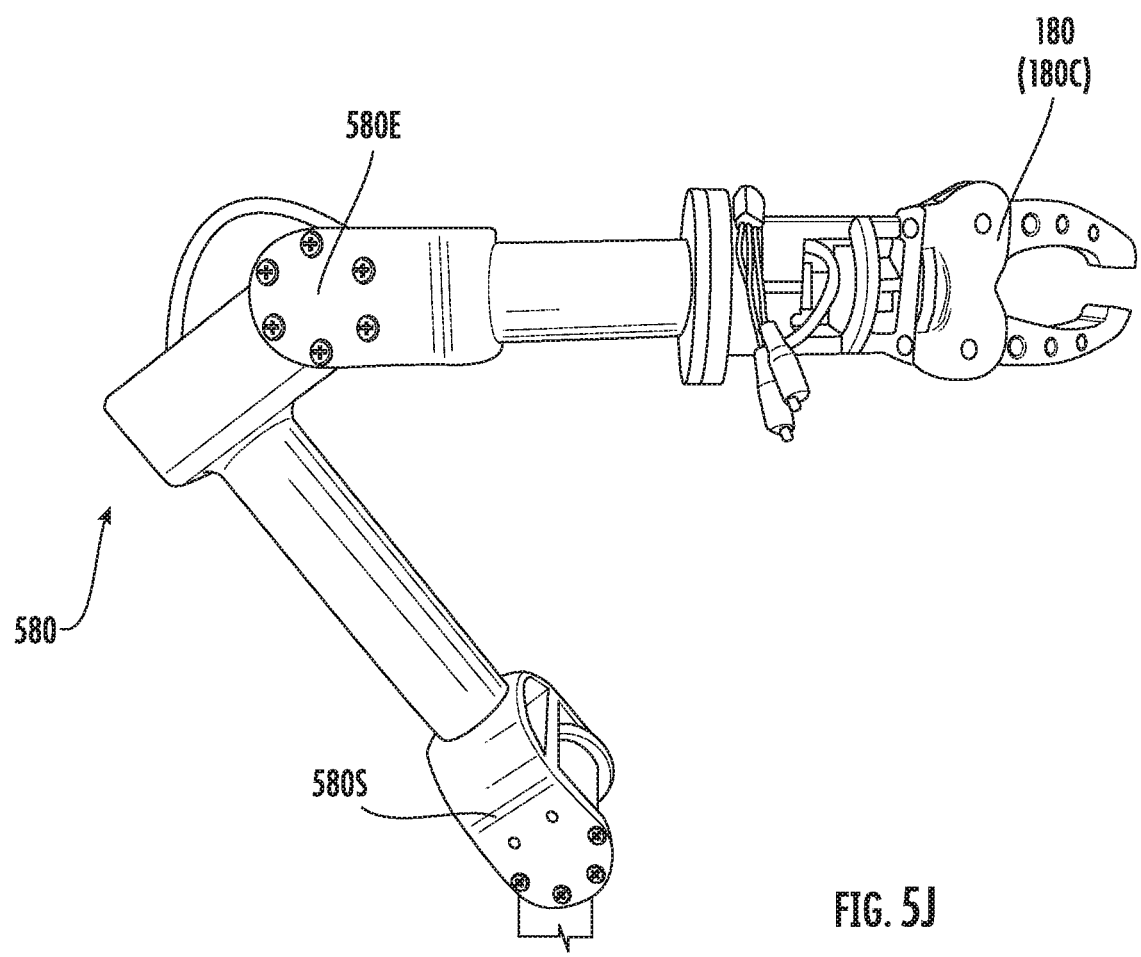
FIG. 5J is a side view of a mechanical arm that has a mechanical appendage attached thereto according to various embodiments of present inventive concepts.

FIG. 5J is a side view of a mechanical arm 580 that has a mechanical appendage 180 attached thereto according to various embodiments of present inventive concepts. The arm 580 may include a shoulder portion 580S and an elbow portion 580E that are configured to rotate on respective axes, and thus provide respective degrees of freedom. The shoulder portion 580S and the elbow portion 580E may be, for example, metal pieces that are connected to each other. One end of the elbow portion 580E may include a rotational axis and may be connected to the shoulder portion 580S, and an opposite end of the elbow portion 580E may be connected to the appendage 180.

By including both the shoulder portion 580S, which can be mounted vertically or horizontally on a robotic breaker-racking apparatus 100, and the elbow portion 580E, the arm 580 may provide an increased range of motion relative to a linear actuator, which only moves backward and forward. The arm 580 can thus help align the appendage 180 with a component of a breaker cubicle 121 (FIG. 1A). For example, the arm 580 can help align a tool 587 (FIG. 5M) that is attached to the appendage 180 with a trip button/switch 124 (FIGS. 1E and 4C) or with a breaker switch 123 (FIGS. 1E and 4A).

In some embodiments, the appendage 180 may be a mechanical claw 180C, as shown in FIG. 5J. The claw 180C may provide a third degree of freedom, in addition to the respective degrees of freedom provided by the shoulder portion 580S and the elbow portion 580E of the arm 580. Moreover, the appendage 180 is not limited to the claw 180C, but rather may be a humanoid hand 180H (FIG. 5K) that provides more degrees of freedom than the claw 180C.

Figure 5K:
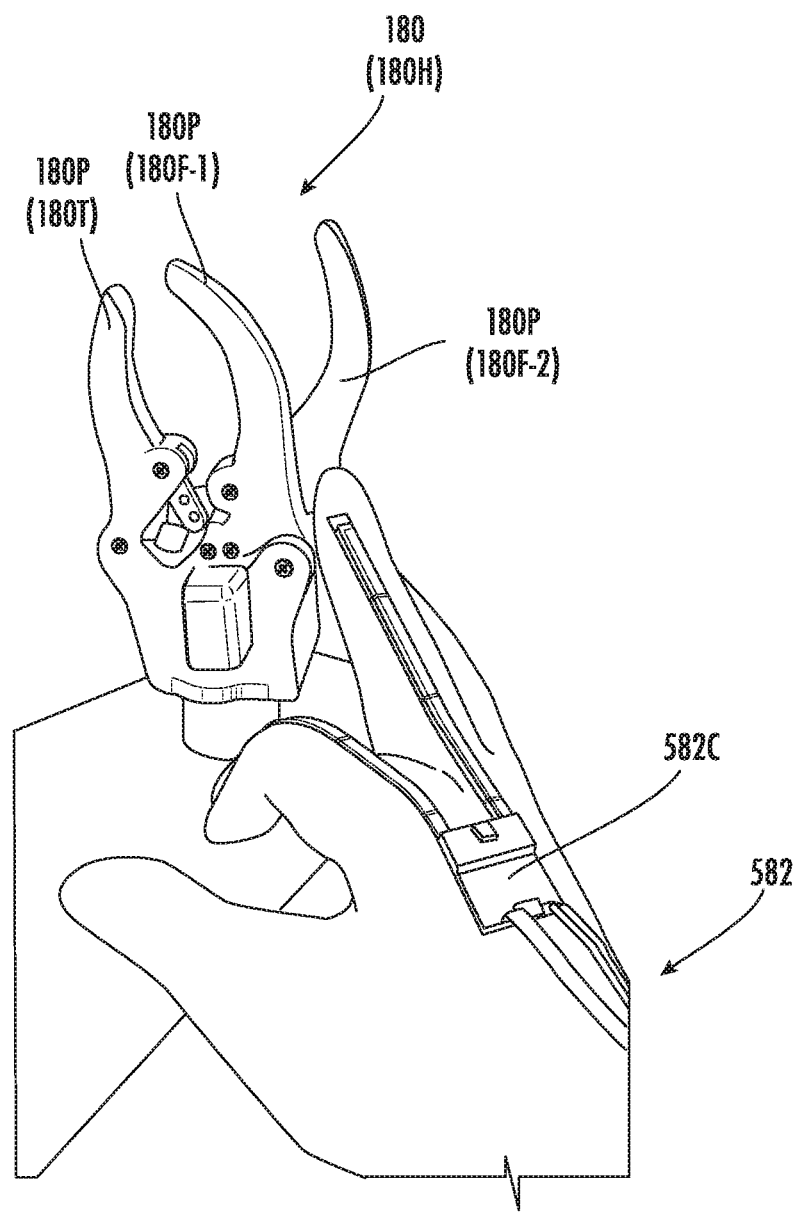
FIG. 5K is a perspective view of a glove that is configured to control movement of a mechanical appendage according to various embodiments of present inventive concepts.

FIG. 5K is a perspective view of a glove 582 that is configured to control movement of a mechanical appendage 180 according to various embodiments of present inventive concepts. The glove 582, when worn by human operator 130 (FIG. 1A), can remotely control movement of one or more pinchers 180P of the appendage 180 in response to movement of the glove 582. For example, the pinchers 180P of a humanoid hand 180H may include a thumb 180T and two fingers 180F-1 and 180F-2, and movement of a thumb portion and/or one or two finger portions of the glove 582 may generate a command to control a corresponding movement of the humanoid hand 180H.

As an example, the glove 582 may include communications circuitry 582C that is configured to transmit, via one or more wireless communications networks, the command to an RF receiver 140-2 (FIG. 5F) of communications circuitry 140 of a robotic breaker-racking apparatus 100 to which the humanoid hand 180H is connected. In particular, motion of the glove 582 can be wirelessly communicated to the humanoid hand 180H, or to a mechanical claw 180C (FIGS. 5D/5E/5J/5L), to perform the operation(s) of Block 230 (FIG. 2A) or the operation(s) of any of Blocks 230-1, 230-2, 230-3, 230-4, 230-5, 230-6, 230-8, 230-9, 230-10, 230-11, or 230-12 (FIG. 2B). In some embodiments, the performance of different operations may be responsive to different commands received via wireless communications circuitry, such as the RF receiver 140-2. The wireless communications between the glove 582 and the robotic breaker-racking apparatus 100 may include cellular/Internet communications and/or non-cellular/non-Internet short-range wireless communications. Advantageously, controlling the appendage 180 via the glove 582 may be more intuitive than control via an electronic device 135 (FIG. 1A) or a joystick, and thus may require less training for the operator 130.

The humanoid hand 180H shown in FIG. 5K has three independently-controllable pinchers 180P, and thus provides third, fourth, and fifth degrees of freedom, in addition to the respective degrees of freedom provided by a shoulder portion 580S and an elbow portion 580E of an arm 580 (FIG. 5J) by which the humanoid hand 180H is connected to the robotic breaker-racking apparatus 100. As used herein, the term "humanoid hand" refers to three or more independently-controllable pinchers 180P. The humanoid hand 180H is not limited, however, to three independently-controllable pinchers 180P. Accordingly, in some embodiments, the humanoid hand 180H may have four, five, or more independently-controllable pinchers 180P.

Figure 5L:
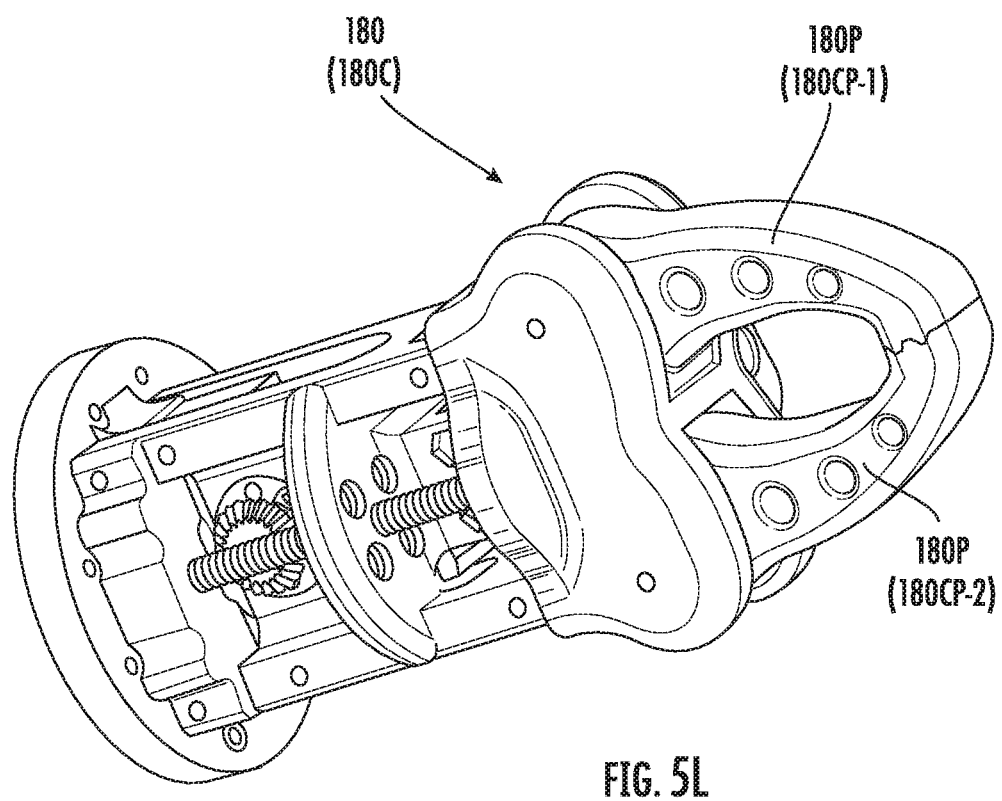
FIG. 5L is a perspective view of a claw that is configured to access a circuit breaker via remote or autonomous control according to various embodiments of present inventive concepts.

FIG. 5L is a perspective view of a mechanical claw 180C according to various embodiments of present inventive concepts. The claw 180C has two pinchers 180CP-1 and 180CP-2 that are configured to close toward each other. In some embodiments, the pinchers 180CP-1 and 180CP-2 may contact each other when they are in a fully closed position. Moreover, the pinchers 180CP-1 and 180CP-2 may, in some embodiments, simultaneously open or close by the same degree.

Figure 5M:
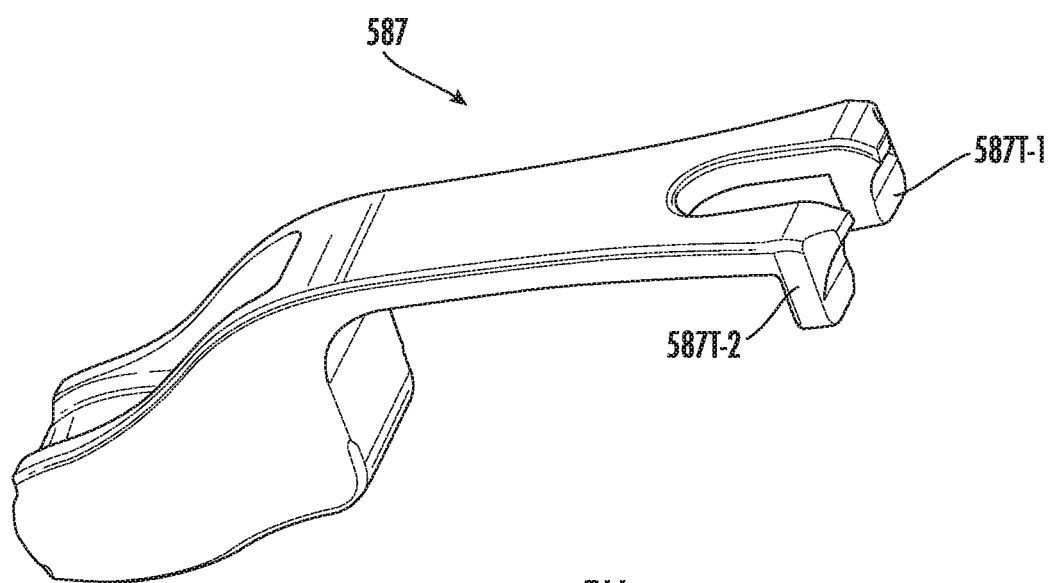
FIG. 5M is a perspective view of a tool that may be on a robotic breaker-racking apparatus according to various embodiments of present inventive concepts.

FIG. 5M is a perspective view of a tool 587 that may be on a robotic breaker-racking apparatus 100 according to various embodiments of present inventive concepts. In particular, the tool 587 may be held by an appendage 180 (FIGS. 5J-5L) that is attached to the robotic breaker-racking apparatus 100. In some embodiments, the tool 587 may include claw teeth 587T-1 and 587T-2 that can interface with a breaker switch 123 (FIGS. 1E and 4A) to open and/or close the breaker switch 123. Moreover, the tool 587 can be quickly and easily swapped with another tool (e.g., a screwdriver) that the appendage 180 can hold. For example, the appendage 180 may simply release its grip on the tool 587 and pick up the other tool. Such use of swappable tools may be faster and less complex than removing the appendage 180 from the robotic breaker-racking apparatus 100 and attaching a different appendage 180.

Features of the robotic breaker-racking apparatus 100 according to various embodiments of present inventive concepts may be either (a) retrofitted onto an existing, manual breaker-racking apparatus or (b) built into a new breaker-racking apparatus. For example, an arm 580 (FIG. 5J), an appendage 180 (FIGS. 5J-5L), a camera 150 (FIG. 5C), and/or communications and control circuitry 530 (FIG. 5F) may be included in a retrofit or a new apparatus.

The risk of arc flash incidents is a problem inherent in generation stations and substations 170. Moreover, the hazards of arc flash incidents threaten both personnel and equipment of utility companies. For example, arc flash incidents may result in fines, equipment damage, personnel injury, personnel fatalities, and/or extensive downtime of stations/substations 170.

With a conventional breaker-racking unit, such as the manual breaker-racking apparatus 300 of FIG. 3, a human operator 130 manually pushes the unit up to a breaker 120, engage the breaker 120, unwind a coil of wire, and then rack the breaker 120 in (where it grabs onto a bus bar 126) or out (where it disengages from the bus bar 126). Accordingly, the human operator 130 is at risk of an arc flash incident while using a conventional breaker-racking unit when a station/substation 170 is producing electricity.

Alternatively, the entire station/substation 170 may discontinue producing electricity to protect the human operator 130 while using a conventional breaker-racking unit. Although such a power shut-down is safer than continuing to produce electricity while the human operator 130 stands in front of a breaker 120, losing station/substation 170 power is not desirable. Accordingly, it would be beneficial to both increase safety for the human operator 130 while avoiding shutting down the station/substation 170.

For example, a breaker trip coil may fail at a station/substation 170, which has large cubicle breakers 120 that may be stuck engaged on a bus bar 126. As a result of the failed coil, an operator 130 using conventional techniques/apparatuses may manually de-energize the bus bar 126. In particular, the operator 130 using conventional techniques/apparatuses may manually open a knife switch 123, push a trip button 124, rack a breaker 120 out, put a new breaker 120 in, and then start the unit up again. It would be beneficial, however, to meet the need of the station/substation 170 without having to bring the unit (e.g., the entire station/substation 170) down.

In contrast with such conventional techniques/apparatuses, using the robotic breaker-racking apparatus 100 according to various embodiments of present inventive concepts can protect/prevent the station/substation 170 from shutting down while also protecting a human operator 130 from an arc flash. For example, the robotic breaker-racking apparatus 100 can be remotely controlled at any distance. As an example, the robotic breaker-racking apparatus 100 can be remotely controlled from a different room, such as from a desk of the human operator 130.

Accordingly, the human operator 130 does not have to stand in front of the malfunctioning breaker 120, which can have an arc flash that can injure or kill the human operator 130. Rather, the robotic breaker-racking apparatus 100 may use its camera(s) 150 to view one or more potential problems in the switchgear room 171 and/or to actuate equipment in the switchgear room 171, thus reducing the risk of harm to the human operator 130. In some embodiments, all of the functions of the robotic breaker-racking apparatus 100, including the operations of FIGS. 2A and 2B, can be controlled remotely by the human operator 130. Alternatively, one or more of the functions may be performed autonomously by the robotic breaker-racking apparatus 100 without requiring real-time input from the human operator 130.

Embodiments herein have been discussed, by way of example, in the context of circuit breakers 120 of a station/substation 170 of an electric utility. Other venues and/or components, however, could benefit from a robot/rover using techniques similar to those performed by the robotic breaker-racking apparatus 100. For example, although the apparatus 100 is referred to herein as robotic "breaker-racking" apparatus, the apparatus 100 may additionally or alternatively be used to perform other potentially-hazardous or undesirable tasks. As an example, the apparatus 100 may be configured to access and change a filter at a nuclear power plant. Accordingly, the apparatus 100 may generally be an "electric utility robot" or a "utility robot," and is not intended to be limited to performing breaker-racking operations.

The present inventive concepts have been described above with reference to the accompanying drawings. The present inventive concepts are not limited to the illustrated embodiments. Rather, these embodiments are intended to fully and completely disclose the present inventive concepts to those skilled in this art. In the drawings, like numbers refer to like elements throughout. Thicknesses and dimensions of some components may be exaggerated for clarity.

Spatially relative terms, such as "under," "below," "lower," "over," "upper," "top," "bottom," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the example term "under" can encompass both an orientation of over and under. The device may be otherwise oriented (rotated 90 degrees or at other orientations) and the spatially relative descriptors used herein interpreted accordingly.

Herein, the terms "attached," "connected," "interconnected," "contacting," "mounted," and the like can mean either direct or indirect attachment or contact between elements, unless stated otherwise.

Well-known functions or constructions may not be described in detail for brevity and/or clarity. As used herein the expression "and/or" includes any and all combinations of one or more of the associated listed items.

The terminology used herein is for the purpose of describing particular embodiments only and is not intended to be limiting of the present inventive concepts. As used herein, the singular forms "a," "an," and "the" are intended to include the plural forms as well, unless the context clearly indicates otherwise. It will be further understood that the terms "comprises," "comprising," "includes," and/or "including" when used in this specification, specify the presence of stated features, operations, elements, and/or components, but do not preclude the presence or addition of one or more other features, operations, elements, components, and/or groups thereof.

What is claimed is:

1. A method of operating a robotic breaker-racking apparatus, the method comprising:
    controlling a motor to drive the robotic breaker-racking apparatus to a first circuit breaker;
    accessing the first circuit breaker via remote or autonomous control of the robotic breaker-racking apparatus, wherein the accessing comprises:
        interfacing the robotic breaker-racking apparatus with a door of a breaker cubicle that houses the first circuit breaker, to open the door;
        interfacing the robotic breaker-racking apparatus with a breaker switch that is inside the breaker cubicle and is coupled to the first circuit breaker, to open the breaker switch; and
        interfacing the robotic breaker-racking apparatus with the first circuit breaker, to perform breaker racking of the first circuit breaker;
    interfacing the robotic breaker-racking apparatus with a trip button or trip switch of the first circuit breaker, to trip the first circuit breaker before performing the breaker racking; and
    visually inspecting, via a camera of the robotic breaker-racking apparatus, a first relay of the first circuit breaker and/or a second relay of a second circuit breaker.

2. The method of claim 1, further comprising:
    interfacing the robotic breaker-racking apparatus with a screw of the door, to unscrew the screw before opening the door;
    further interfacing the robotic breaker-racking apparatus with the door, to maintain a position of the door;
    further interfacing the robotic breaker-racking apparatus with the door, to release the door from the position;
    further interfacing the robotic breaker-racking apparatus with the door, to close the door; and
    further interfacing the robotic breaker-racking apparatus with the screw, to re-screw the screw.

3. The method of claim 1, wherein the controlling the motor comprises controlling travel of the robotic breaker-racking apparatus from a first location within a switchgear room of a generating station or a substation of an electric utility to a second location within the switchgear room.

4. The method of claim 3, wherein the controlling travel of the robotic breaker-racking apparatus is performed while using the camera.

5. The method of claim 4, wherein the controlling travel of the robotic breaker-racking apparatus is performed while transmitting data from the camera via communications circuitry of the robotic breaker-racking apparatus.

6. The method of claim 5, wherein the transmitting data comprises transmitting a live video feed from the camera to an electronic device of a human operator of the robotic breaker-racking apparatus via the communications circuitry.

7. The method of claim 1, wherein the accessing the first circuit breaker is performed while using the camera.

8. The method of claim 7, wherein the accessing the first circuit breaker is performed while transmitting data from the camera via communications circuitry of the robotic breaker-racking apparatus.

9. The method of claim 8, wherein the transmitting data comprises transmitting a live video feed from the camera to an electronic device of a human operator of the robotic breaker-racking apparatus via the communications circuitry.

10. The method of claim 1, further comprising:
receiving a remote command, wherein the controlling the motor is performed in response to the remote command.

11. The method of claim 1, further comprising:
detecting, via the camera, a status and/or an identifier of the first relay of the first circuit breaker.

12. The method of claim 1, wherein the interfacing the robotic breaker-racking apparatus with the breaker switch comprises:
opening a knife switch that is inside the breaker cubicle, while the door is open and before tripping the first circuit breaker.

13. A robotic breaker-racking apparatus comprising:
a motor configured to drive the robotic breaker-racking apparatus to a first circuit breaker;
a mechanical appendage configured to access the first circuit breaker via remote or autonomous control, wherein the access comprises:
interfacing the robotic breaker-racking apparatus with a door of a breaker cubicle that houses the first circuit breaker, to open the door;
interfacing the robotic breaker-racking apparatus with a breaker switch that is inside the breaker cubicle and is coupled to the first circuit breaker, to open the breaker switch;
interfacing the robotic breaker-racking apparatus with the first circuit breaker, to perform breaker racking of the first circuit breaker; and
interfacing the robotic breaker-racking apparatus with a trip button or trip switch of the first circuit breaker, to trip the first circuit breaker before performing the breaker racking; and
a camera configured to visually inspect a first relay of the first circuit breaker and/or a second relay of a second circuit breaker.

14. The robotic breaker-racking apparatus of claim 13, wherein the mechanical appendage comprises a humanoid hand or a two-pincher mechanical claw.

15. The robotic breaker-racking apparatus of claim 13, wherein the camera comprises one among a plurality of cameras of the robotic breaker-racking apparatus.

16. The robotic breaker-racking apparatus of claim 13, wherein the camera comprises a thermal sensor.

17. The robotic breaker-racking apparatus of claim 13, further comprising a laser-guidance system.

18. The robotic breaker-racking apparatus of claim 13, further comprising a mechanical arm comprising a shoulder portion and an elbow portion that are configured to rotate on respective axes,
wherein the mechanical appendage is connected to the mechanical arm.

19. A method of operating a robotic breaker-racking apparatus, the method comprising:
controlling a motor to drive the robotic breaker-racking apparatus to a first circuit breaker;
accessing, using a humanoid hand or a mechanical claw of the robotic breaker-racking apparatus, the first circuit breaker via remote or autonomous control of the robotic breaker-racking apparatus, wherein the accessing comprises:
interfacing the robotic breaker-racking apparatus with a door of a breaker cubicle that houses the first circuit breaker, to open the door; and
interfacing the robotic breaker-racking apparatus with a screw of the door, to unscrew the screw before opening the door; and
visually inspecting, via a camera of the robotic breaker-racking apparatus, a first relay of the first circuit breaker and/or a second relay of a second circuit breaker.

20. The method of claim 19,
wherein the accessing further comprises:
receiving, via wireless communications circuitry of the robotic breaker-racking apparatus, a command from a human-worn glove, and
wherein the interfacing the robotic breaker-racking apparatus with the door comprises:
interfacing the humanoid hand or the mechanical claw of the robotic breaker-racking apparatus with the door, to open the door, in response to the command from the human-worn glove.

21. The method of claim 20, wherein the accessing further comprises:
receiving, via the wireless communications circuitry of the robotic breaker-racking apparatus, a further command from the human-worn glove; and
interfacing a tool held by the humanoid hand or the mechanical claw of the robotic breaker-racking apparatus with a breaker switch that is inside the breaker cubicle and is coupled to the first circuit breaker, to open the breaker switch, in response to the further command from the human-worn glove.

22. The method of claim 19, wherein the screw holds the door shut, before unscrewing the screw.

* * * * *